(12) United States Patent
Kamijo et al.

(10) Patent No.: US 6,257,204 B1
(45) Date of Patent: Jul. 10, 2001

(54) CONTROL APPARATUS AND METHOD FOR HIGH-PRESSURE FUEL PUMP FOR INTERNAL COMBUSTION ENGINE

(75) Inventors: Yusuke Kamijo; Noboru Takagi; Daichi Yamazaki; Hiroyuki Mizuno, all of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/615,596

(22) Filed: Jul. 13, 2000

(30) Foreign Application Priority Data

Aug. 4, 1999 (JP) ................................................. 11-221671

(51) Int. Cl.$^7$ .................................................... F02M 37/04
(52) U.S. Cl. ...................... 123/456; 123/506; 123/179.17
(58) Field of Search .................................... 123/506, 456, 123/179.17, 446, 357

(56) References Cited

U.S. PATENT DOCUMENTS

| | | | |
|---|---|---|---|
| 5,277,163 | * | 1/1994 | Ohishi ................................. 123/506 |
| 5,375,575 | * | 12/1994 | Ohishi et al. ........................ 123/446 |
| 5,582,153 | * | 12/1996 | Dutt et al. ........................... 123/450 |
| 5,638,789 | * | 6/1997 | Hayner ................................. 123/357 |
| 5,771,864 | * | 6/1998 | Morishita et al. ................... 123/456 |
| 6,065,436 | * | 5/2000 | Koga et al. ..................... 123/179.17 |
| 6,131,548 | * | 10/2000 | Yano ................................... 123/456 |

FOREIGN PATENT DOCUMENTS 4-50462    2/1992  (JP) .

* cited by examiner

Primary Examiner—Carl S. Miller
(74) Attorney, Agent, or Firm—Oliff & Berridge PLC

(57) ABSTRACT

In a high-pressure pump for an internal combustion engine, a spill valve is inhibited from being stopped frequently. If the fuel injection amount becomes smaller than a predetermined amount, a method of determination is changed so that a feedforward term for duty control increases. This makes it unlikely that the duty ratio will become equal to zero. Operation resulting from a closing motion of the spill valve occurs substantially regularly. As a result, the circumstance where operation noise is generated irregularly is avoided, and a sense of incongruity given to the driver is reduced.

12 Claims, 17 Drawing Sheets

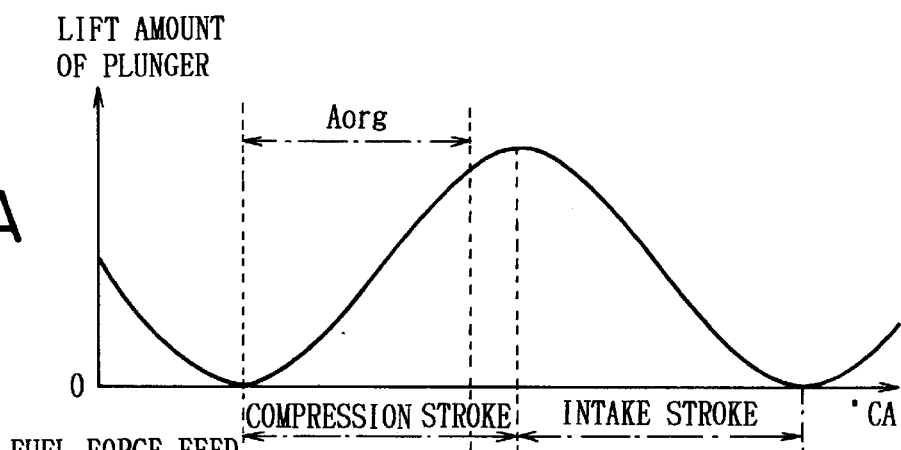
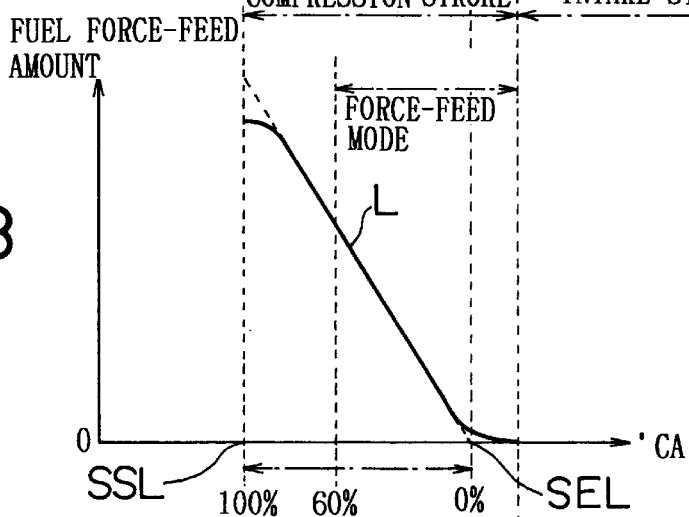
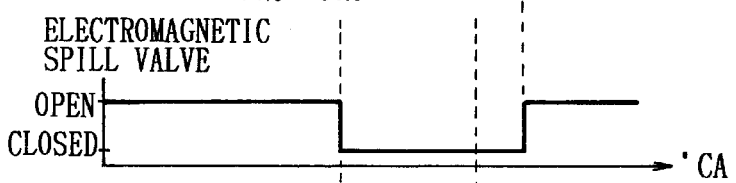
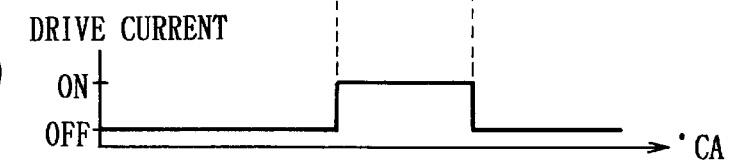

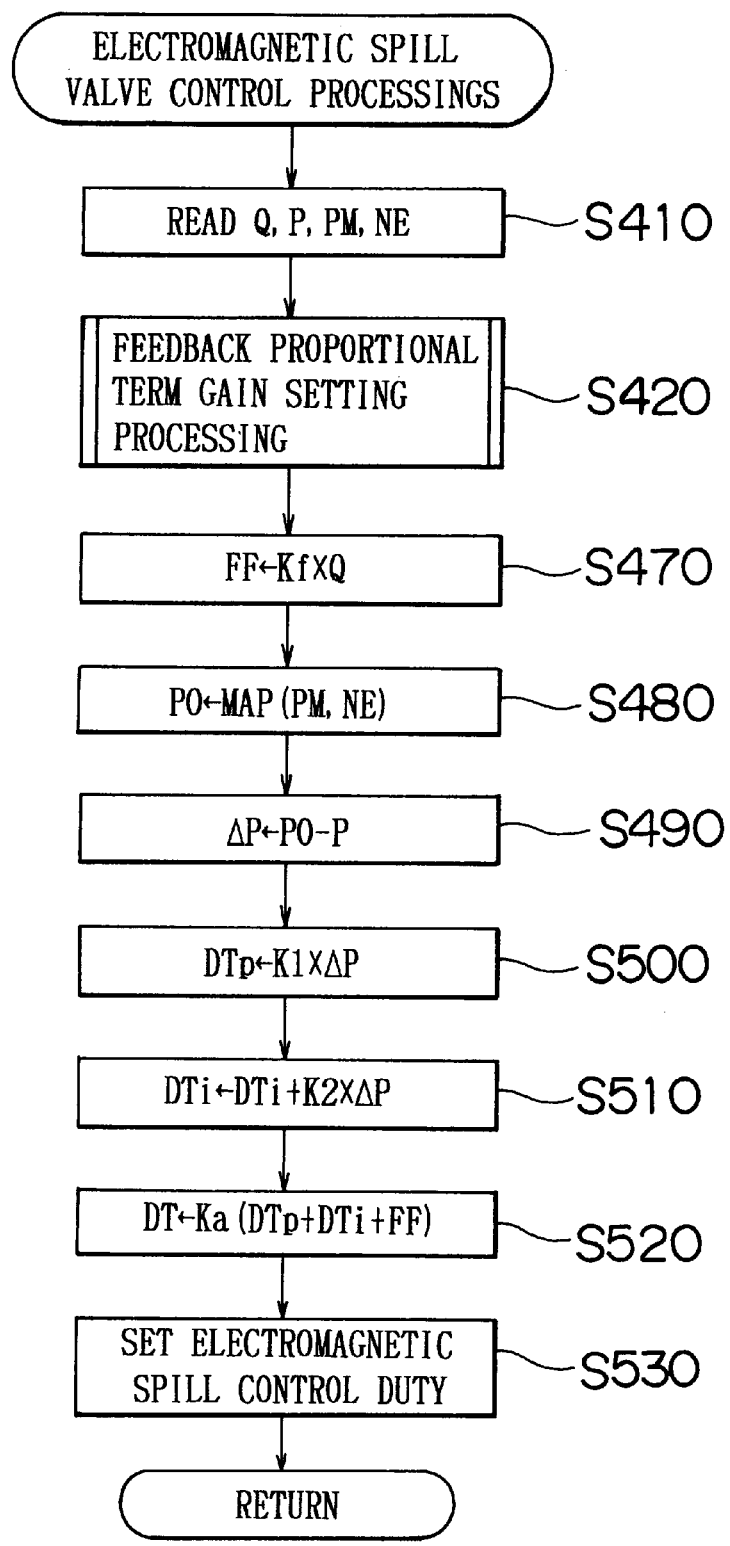

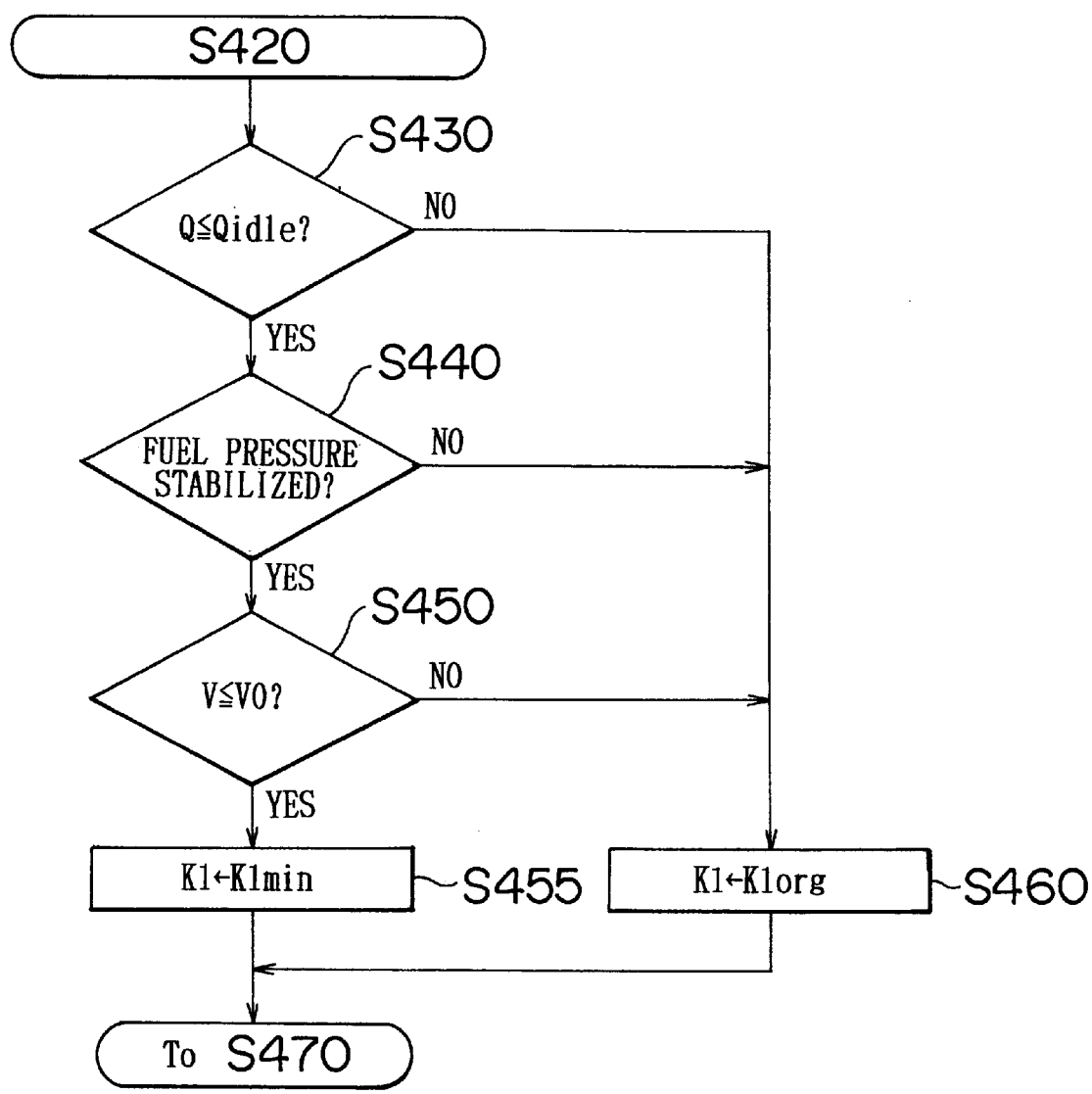

CONTROL APPARATUS AND METHOD FOR HIGH-PRESSURE FUEL PUMP FOR INTERNAL COMBUSTION ENGINE

INCORPORATION BY REFERENCE

The disclosure of Japanese Patent Application No. 11-221671 filed on Aug. 4, 1999 including the specification, drawings and abstract is incorporated herein by reference in its entirety.

BACKGROUND OF THE INVENTION

1. Field of the Invention

The invention relates to a control apparatus for a high-pressure fuel pump for an internal combustion engine which periodically repeats an intake stroke in which fuel is sucked from a low-pressure side into a pump chamber by increasing a volume in the pump chamber, and a compression stroke in which fuel in the pump chamber is compressed by reducing a volume in the pump chamber, and which adjusts an amount of fuel that is force-fed to the side of a fuel injection valve by opening or closing a spill valve during the compression stroke.

2. Description of Related Art

In an internal combustion engine (e.g., a direct-fuel-injection-type internal combustion engine) in which fuel injection valves are employed to supply combustion chambers with a required amount of fuel during a compression stroke, a precise amount of fuel needs to be injected from the fuel injection valves to cause desired combustion. In order to inject a precise amount of fuel, a fuel pressure for the fuel injection valves (e.g., a fuel pressure in a fuel distribution pipe for distributing fuel to the fuel injection valves) needs to be adjusted to a suitable pressure.

For this adjustment of a fuel pressure, a sufficient amount of fuel needs to be supplied separately to the fuel distribution pipe from a fuel pump in such a manner as to supplement an amount of fuel injected from the fuel injection valves (an amount of consumption). To realize this, it is known to perform an operation in which fuel of an amount exceeding a maximum amount of fuel injected from the fuel injection valves is constantly supplied to the fuel distribution pipe so that the fuel pressure does not decrease due to a deficiency of fuel no matter how much fuel is actually injected from the fuel injection valves (even though a smaller amount of fuel than the maximum fuel injection amount is injected from the fuel injection valves). In this case, a surplus of fuel that has not been injected from the fuel injection valves is again returned to a fuel pump or to a fuel tank through a relief valve provided in the fuel distribution pipe.

However, if an excessive amount of fuel is constantly supplied to the fuel distribution pipe and caused to circulate therethrough, a large amount of energy is required in accordance with a surplus of fuel that has been supplied. This leads to deterioration of fuel consumption of the internal combustion engine.

Thus, with a view to preventing such waste of energy, there has been proposed an operation in which fuel of an amount that just supplements an amount of fuel injected from fuel injection valves is supplied from a fuel pump to a fuel distribution pipe (see, e.g., Japanese Patent Application Laid-Open No. 4-50462). In this application, a feed-forward term based on a fuel injection amount is first calculated to set a period for openingly driving an electromagnetic spill valve that is provided in a high-pressure fuel pump for force-feeding fuel into the fuel distribution pipe. Then, a feedback term based on a difference between a fuel pressure and a target fuel pressure is added to the feed-forward term, and a required control amount is set as a ratio (duty) of the period for openingly driving the electromagnetic valve. This control makes the amount of fuel supplied to the fuel distribution pipe neither excessive nor deficient. This eliminates the necessity to constantly cause a large amount of fuel to circulate through the fuel distribution pipe. As a result, the energy required for fuel supply control decreases, and it becomes possible to prevent deterioration of fuel consumption of the internal combustion engine.

However, according to the aforementioned control operation, if the fuel injection amount becomes small (e.g., at the time of idling), the feedback term gradually decreases in response to a decrease in the feed-forward term. Eventually there may arise a situation where the calculated duty ratio frequently becomes equal to zero (0%). If the duty ratio becomes equal to zero, the electromagnetic spill valve is stopped from being closingly driven. Therefore, operation noise resulting from a closing motion of the electromagnetic spill valve frequently ceases. Because such cessation of the closing motion of the spill valve results from the feedback term, it is not possible to ensure that the spill valve is stopped periodically. As a result, irregular cessation of a closing motion of the spill valve brings about generation of irregular operation noise audible to the driver. Thus, the driver may feel a sense of incongruity.

SUMMARY OF THE INVENTION

It is an object of the invention to inhibit a spill valve from being stopped frequently in a high-pressure fuel pump for an internal combustion engine.

To achieve the above and/or other objects, according to one aspect of the invention, there is provided a control apparatus for a high-pressure fuel pump employed in an internal combustion engine which periodically repeats an intake stroke in which fuel is sucked from a low-pressure side into a pump chamber by increasing a volume in the pump chamber, and a compression stroke in which fuel in the pump chamber is compressed by reducing a volume in the pump chamber. This control apparatus has a spill valve which switches its operation between a non-force-feed mode in which no fuel is force-fed from the pump chamber to a fuel injection valve in the compression stroke, and a force-feed mode in which fuel is force-fed to the fuel injection valve. The apparatus also includes a fuel pressure detector which detects a fuel pressure for the fuel injection valve, and a controller. The controller determines a fuel injection amount corresponding to an operation state of the internal combustion engine, determines a feed-forward term, which is used for a duty control, based on the determined fuel injection amount, and determines a feedback term based on the detected fuel pressure. This controller determines a duty ratio for open and closed states of the spill valve based on the sum of the feed-forward term and the feedback term, and determines timings for starting and ending for close-controlling the spill valve based on the duty ratio. Furthermore, the controller sets the duty ratio to a value greater than zero if the determined fuel injection amount becomes smaller than a predetermined amount.

This reduces the frequency at which the ratio of the closingly-driven state of the spill valve becomes equal to zero, and prevents operation noise resulting from a closing motion of the spill valve from being stopped frequently. Thus, irregular operation noise is inhibited, and a sense of incongruity given to the driver is reduced.

BRIEF DESCRIPTION OF THE DRAWINGS

The foregoing and further objects, features and advantages of the invention will become apparent from the following description of preferred embodiments with reference to the accompanying drawings, in which:

FIGS. 14A through 14D are timing charts for explaining timings of setting control periods for closingly driving a spill valve for normal operation and the driving of the electromagnetic spill valve in the first embodiment;

FIG. 18 is a flowchart of electromagnetic spill valve control processing performed in a second embodiment of the invention;

FIG. 19 is a flowchart of feedback proportional term gain setting processing performed in the second embodiment;

DETAILED DESCRIPTION OF PREFERRED EMBODIMENTS

Embodiments of the invention will be described hereinafter with reference to the drawings.

Figure 1:
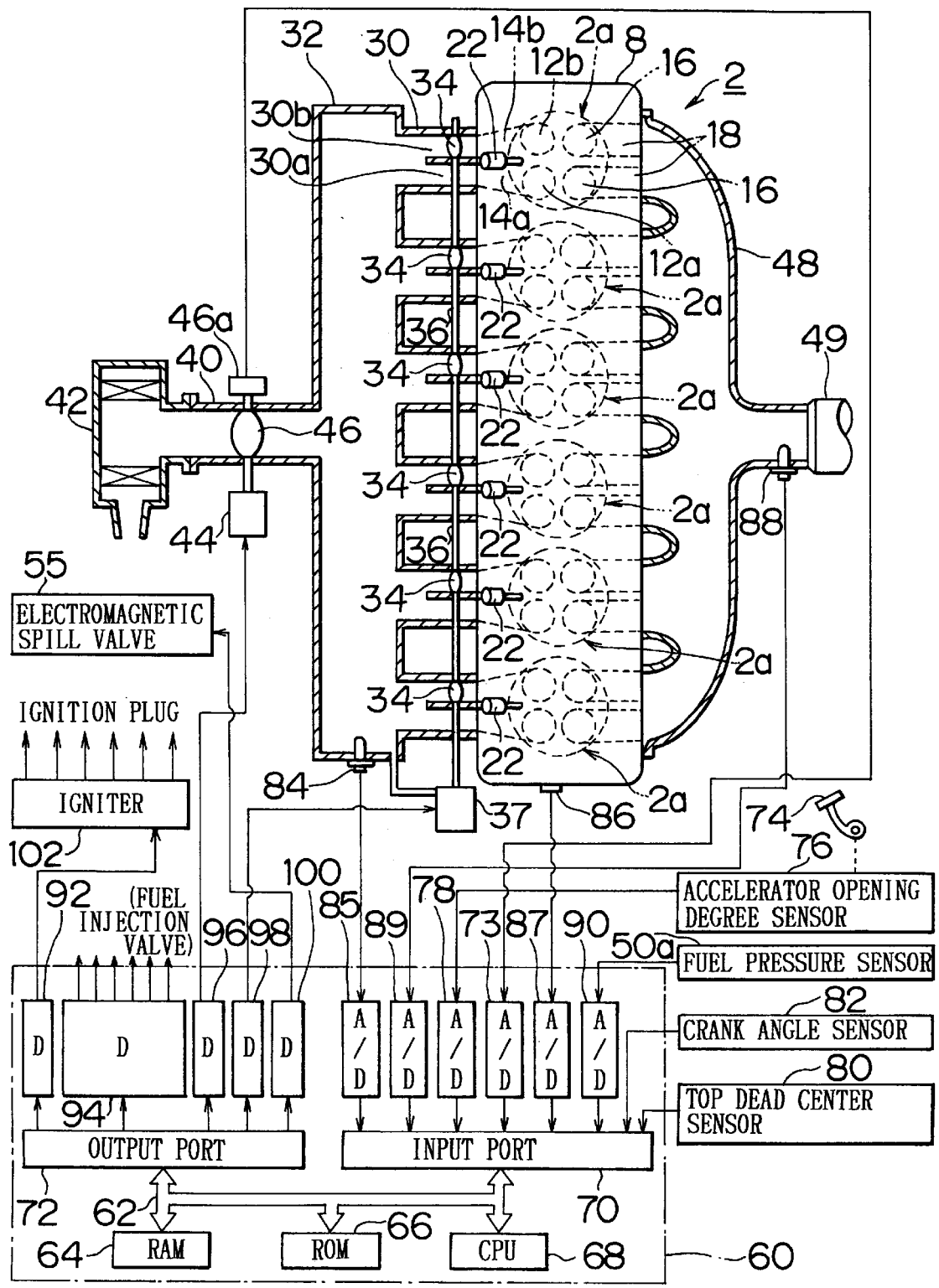
FIG. 1 is a block diagram schematically showing the structure of a direct-fuelinjection-type internal combustion engine to which a first embodiment of the invention is applied, and the structure of a control apparatus of the first embodiment.

FIG. 1 schematically shows the structure of a direct-fuel-injection-type internal combustion engine to which the invention is applied, and of a control apparatus of the internal combustion engine.

A gasoline engine designed as a direct-fuel-injection-type internal combustion engine (hereinafter referred to simply as an "engine") 2 is installed in a motor vehicle. The motor vehicle is driven by an output from the engine 2. The engine 2 has six cylinders 2a. A combustion chamber 10, which is defined by a cylinder block 4, a piston 6 reciprocating within the cylinder block 4 and a cylinder head 8 mounted on the cylinder block 4, is formed in each of the cylinders 2a (see FIGS. 2 through 5).

A first intake valve 12a, a second intake valve 12b and a pair of exhaust valves 16 are provided in each of the combustion chambers 10. The first intake valve 12a is connected to a first intake port 14a, and the second intake valve 12b is connected to a second intake port 14b. The exhaust valves 16 are connected to a pair of exhaust ports 18.

Figure 2:
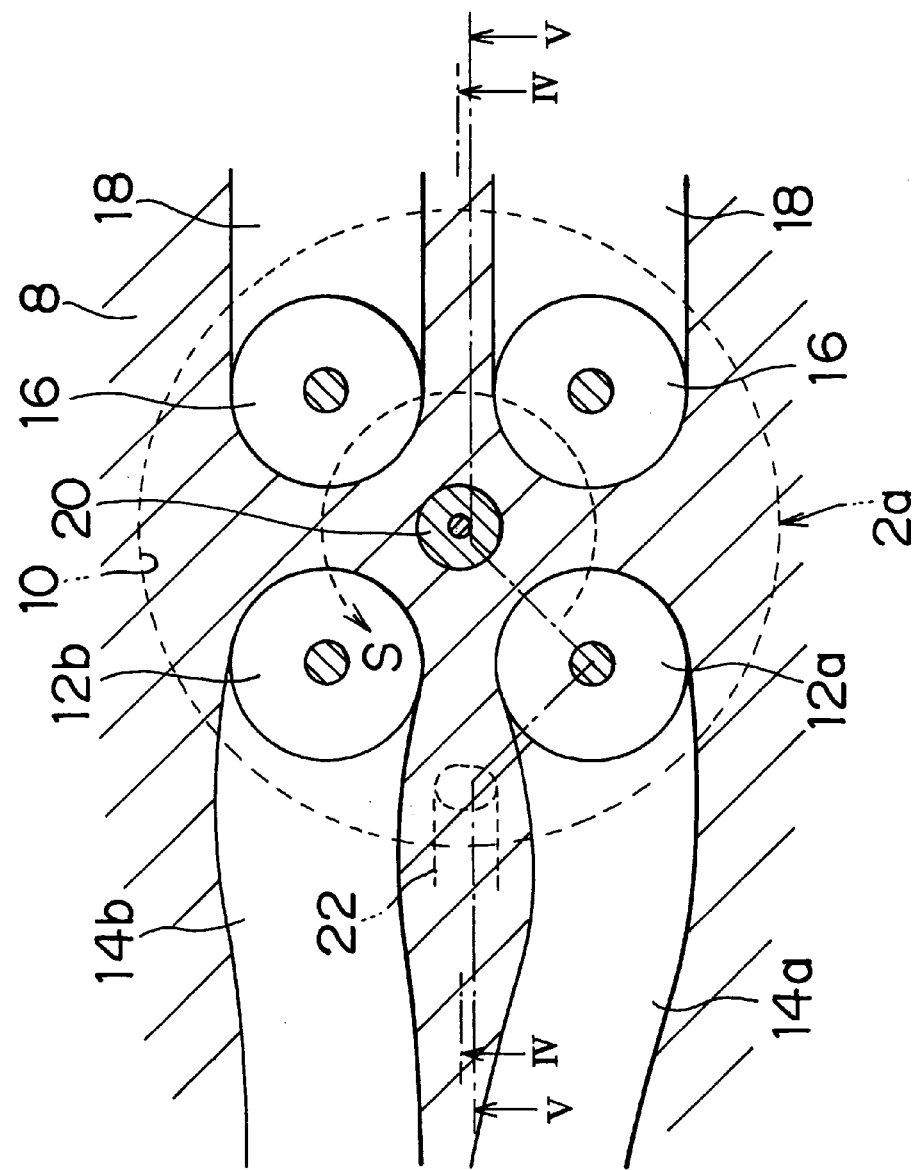
FIG. 2 is a plan cross-sectional view of a cylinder head.

FIG. 2 shows a plan cross-sectional view of the cylinder head 8. As shown in FIG. 2, the first intake port 14a and the second intake port 14b are straight-type intake ports extending generally rectilinearly. An ignition plug 20 is disposed in a central portion on an inner wall surface of the cylinder head 8. In addition, a fuel injection valve 22 is disposed in a peripheral portion on the inner wall surface of the cylinder head in the neighborhood of the first intake valve 12a and the second intake valve 12b so that fuel can be directly injected into the combustion chamber 10.

Figure 3:
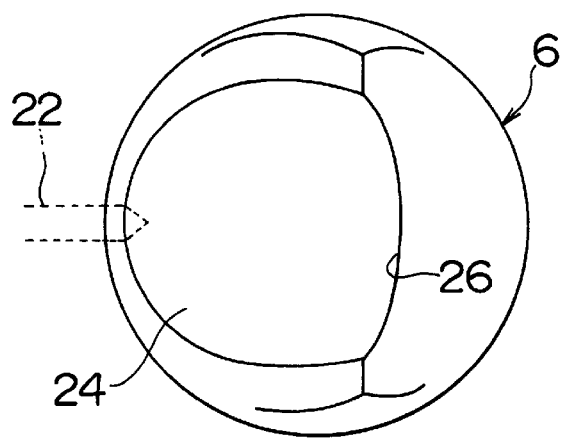
FIG. 3 is a plan view of a top face of a piston.
Figure 4:
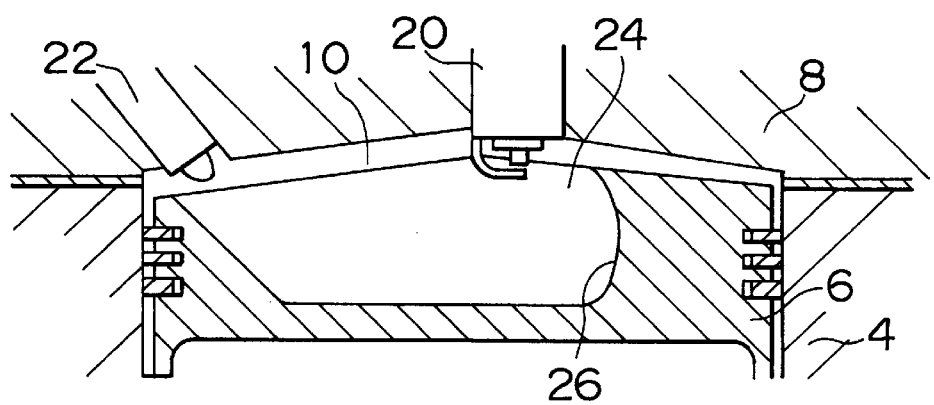
FIG. 4 is a cross-sectional view taken along a line IV—IV shown in FIG. 2.
Figure 5:
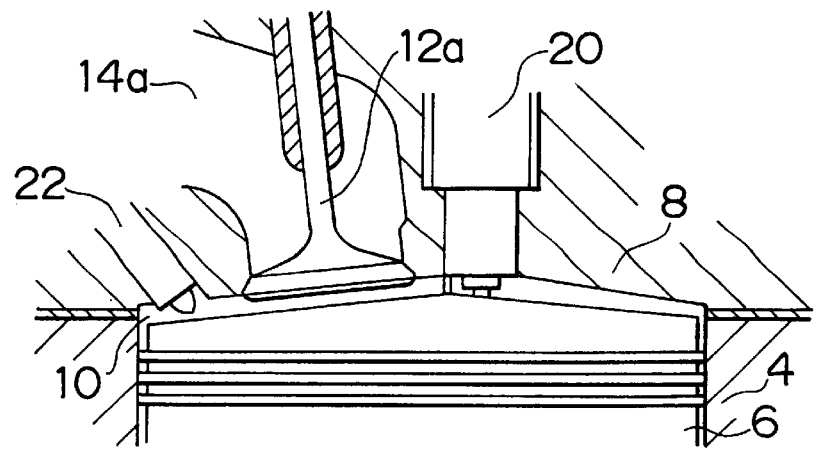
FIG. 5 is a cross-sectional view taken along a line V—V shown in FIG. 2.

FIG. 3 is a plan view of a top face of the piston 6. FIG. 4 is a cross-sectional view taken along line IV—IV in FIG. 2. FIG. 5 is a cross-sectional view taken along a line V—V shown in FIG. 2. As shown in these drawings, a recess portion 24, which has a dome-shaped contour and extends from a lower portion of the fuel injection valve 22 to a lower portion of the ignition plug 20, is formed in the top face of the piston 6.

As shown in FIG. 1, the first intake port 14a of each of the cylinders 2a is connected to a surge tank 32 through a first intake passage 30a formed in an intake manifold 30. The second intake port 14b of each of the cylinders 2a is coupled to the surge tank 32 through a second intake passage 30b. An air flow control valve 34 is disposed in each of the second intake passages 30b. These air flow control valves 34, which are connected to one another through a common shaft 36, are opened and closed through a negative-pressure-type actuator 37 through the shaft 36. When the air flow control valve 34 is closed, a powerful swirl (indicated by S in FIG. 2) is generated in the combustion chamber 10 by intake air which enters only from the first intake port 14a. The surge tank 32 leads to an air cleaner 42 through an intake duct 40. A throttle valve 46, which is driven by a motor 44 (a DC motor or a step motor), is disposed in the intake duct 40. A throttle opening degree sensor 46a detects an opening degree of the throttle valve 46 (a throttle opening degree TA). The opening degree of the throttle valve 46 is controlled in accordance with an operation state of the internal combustion engine.

The exhaust ports 18 of the cylinders 2a communicate with an exhaust manifold 48. Exhaust gas flowing through the exhaust manifold is purified by a catalytic converter 49 and then discharged to the outside.

Figure 6:
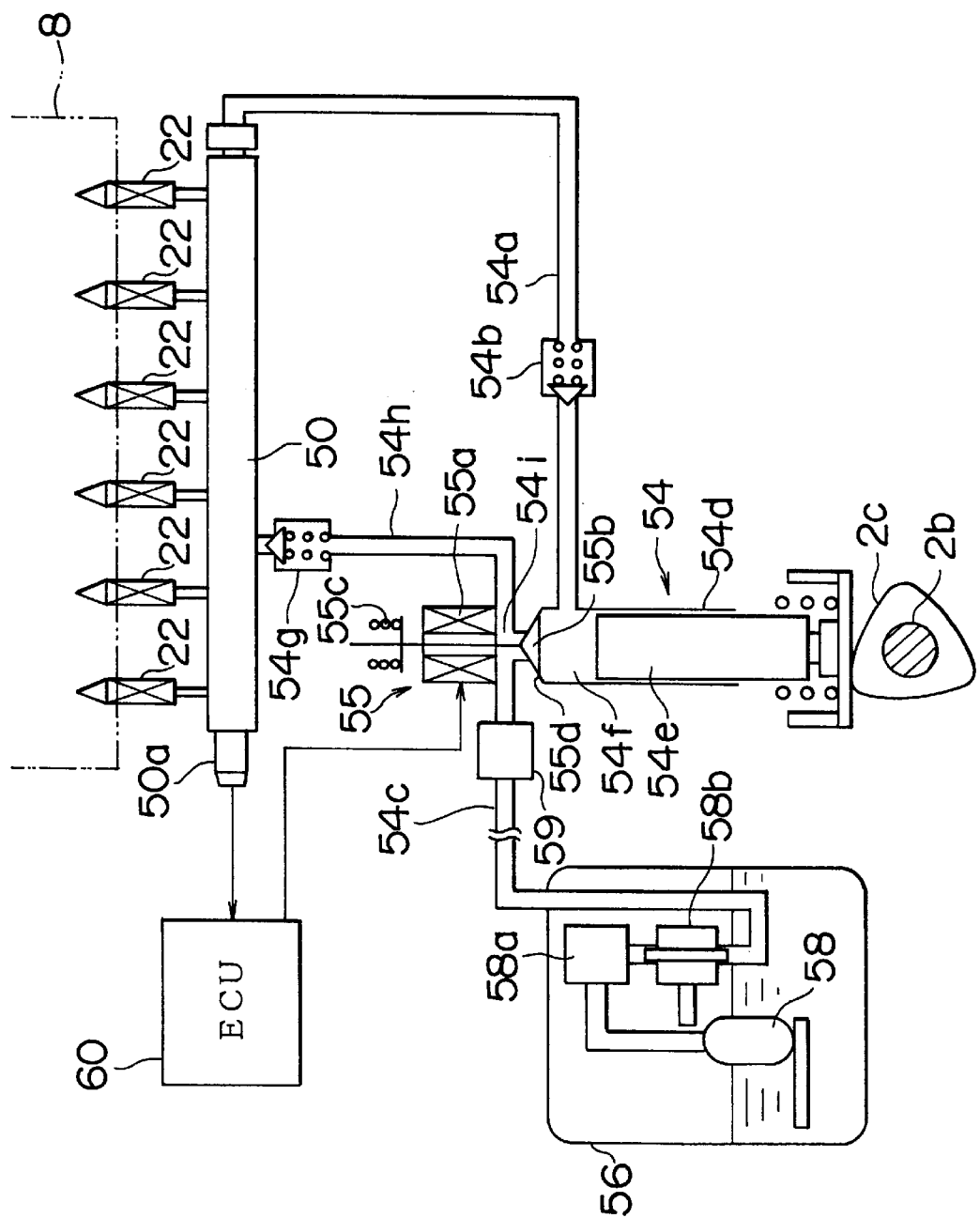
FIG. 6 is an explanatory view of the structure of a fuel feed system.

FIG. 6 shows the structure of a fuel feed system. The cylinder head 8 is equipped with a fuel distribution pipe 50. The fuel distribution pipe 50 is connected to fuel injection valves 22 provided in the cylinders 2a. During stratified combustion and homogeneous combustion, fuel supplied from the fuel distribution pipe 50 is directly injected into the combustion chambers 10 from the fuel injection valves 22.

The fuel distribution pipe 50, which distributes fuel into the fuel injection valves 22, is connected to the high-pressure fuel pump 54 through a high-pressure fuel passage 54a. A check valve 54b, which prevents fuel from flowing reversely toward the high-pressure fuel pump 54 from the fuel distribution pipe 50, is provided in the high-pressure fuel passage 54a. A feed pump 58 provided in a fuel tank 56 is connected to the high-pressure fuel pump 54 through a low-pressure fuel passage 54c. A pulsation damper 59 is disposed in the midst of the low-pressure fuel passage 54c to damp low-pressure pulsation of fuel generated when driving the high-pressure fuel pump 54. The feed pump 58 sucks fuel in the fuel tank 56 and discharges the fuel toward the low-pressure fuel passage 54c, thus delivering it to a gallery 54i of the high-pressure fuel pump 54 through a filter 58a, a pressure regulator 58b and the pulsation damper 59.

The high-pressure fuel pump 54 is attached to the cylinder head 8 or a cylinder head cover (not shown). A pump cam 2c provided on a cam shaft 2b for intake or exhaust valves of the engine 2 rotates, whereby a plunger 54e in a pump cylinder 54d reciprocates. During an intake stroke, in which a high-pressure pump chamber 54f increases in volume through reciprocating movement of the plunger 54e (a downward movement shown in the drawing), fuel is sucked into the high-pressure pump chamber 54f through the gallery 54i from the side of the low-pressure fuel passage 54c. During a compression stroke, in which the high-pressure pump chamber 54f decreases in volume, fuel pressurized in the high-pressure pump chamber 54f is force-fed to the fuel distribution pipe 50 through the high-pressure fuel passage 54a at required timings, as will be described later.

An electromagnetic spill valve 55 is provided inside the high-pressure fuel pump 54. The electromagnetic spill valve 55 is a switching valve which places the gallery 54i into or out of communication with the high-pressure pump chamber 54f. When the electromagnetic spill valve 55 is open with a valve body 55b spaced apart from a seat portion 55d, the gallery 54i communicates with the high-pressure pump chamber 54f. In this state, fuel that has been sucked into the high-pressure pump chamber 54f through the gallery 54i from the side of the low-pressure fuel passage 54c during an intake stroke overflows into the gallery 54i even during a compression stroke. Thus, the fuel is returned to the side of the low-pressure fuel passage 54c through the gallery 54i without being force-fed to the side of the fuel distribution pipe 50 through the high-pressure fuel passage 54a. This state, in which fuel is not force-fed to the side of the fuel distribution pipe 50 with the electromagnetic spill valve 55 being open during the compression stroke, will be referred to as a non-force-feed mode (or state).

On the other hand, when the electromagnetic spill valve 55 is closed with the valve body 55b sitting on the seat portion 55d, the gallery 54i is out of communication with the high-pressure pump chamber 54f. Thus, during the compression stroke, fuel is pressurized without flowing to the side of the gallery 54i. This pressurized fuel pushes the check valve 54b open and is force-fed to the side of the fuel distribution pipe 50 through the high-pressure fuel passage 54a. This state, in which fuel is force-fed to the side of the fuel distribution pipe 50 with the electromagnetic spill valve 55 closed during the compression stroke, will be referred to as a force-feed mode (or state).

An electronic control unit (hereinafter referred to as an ECU) 60 performs duty control of the switch-driving of the electromagnetic spill valve 55 by referring to a fuel pressure P detected by a fuel pressure sensor 50a attached to the fuel distribution pipe 50 and a fuel injection amount Q calculated separately by the ECU 60. Thereby the ECU 60 adjusts an amount of fuel pressurized and force-fed to the fuel distribution pipe 50 from the high-pressure fuel pump 54, and adjusts a fuel pressure P in the fuel distribution pipe 50 to a required pressure.

A discharge path 54h having a relief valve 54g is connected to the fuel distribution pipe 50. If the fuel pressure in the fuel distribution pipe 50 becomes higher than the required pressure as a result of an excessive amount of fuel supplied to the fuel distribution pipe 50, the relief valve 54g is opened to discharge fuel to the side of the discharge path 54h, whereby fuel in the fuel distribution pipe 50 is prevented from reaching an excessively high pressure. The fuel discharged to the side of the discharge path 54h is returned to the side of the gallery 54i. Thus, this fuel feed system is designed as a returnless fuel feed system in which an excessive amount of fuel in the fuel distribution pipe 50 is not directly returned to the fuel tank 56.

In the returnless fuel feed system, in the case where fuel is returned from the fuel distribution pipe 50 to the discharge path 54h, fuel in the range from the discharge path 54h to the low-pressure fuel passage 54c rises in pressure. Then the pressure regulator 58b in the fuel tank 56 is opened. Thereby, out of the fuel in the low-pressure fuel passage 54c, fuel in the neighborhood of the pressure regulator 58b, namely, fuel that has just been pumped up from the feed pump 58 is returned into the fuel tank 56 from the pressure regulator 58b. In this manner, fuel in a low-pressure system extending from the discharge path 54h to the low-pressure fuel passage 54c is prevented from rising in pressure. Furthermore, fuel that has just been pumped up from the fuel tank 56 is returned into the fuel tank 56. Therefore, it is possible to prevent fuel in the fuel tank 56 from rising in temperature.

As shown in FIG. 1, the ECU 60 is a digital computer and has a RAM (random access memory) 64, a ROM (read only memory) 66, a CPU (microprocessor) 68, an input port 70 and an output port 72, which are interconnected to one another through a bi-directional bus 62. The throttle opening degree sensor 46a, which detects a throttle opening degree TA, inputs an output voltage proportional to an opening degree of the throttle valve 46 to the input port 70 through an AD converter 73. An accelerator opening degree sensor 76, which is attached to an accelerator pedal 74, inputs an output voltage proportional to a depression amount of the accelerator pedal 74 to the input port 70 through an AD converter 78. A top dead center sensor 80 generates an output pulse, for example, when the first one of the cylinders 2a reaches an intake top dead center. This output pulse is input to the input port 70. A crank angle sensor 82 generates an output pulse every time a crank shaft rotates by 30°. This output pulse is input to the input port 70. In the CPU 68, a current crank angle (° CA) is calculated from an output pulse of the top dead center sensor 80 and an output pulse of the crank angle sensor 82. In the CPU 68, an engine speed NE is calculated from a frequency at which the crank angle sensor 82 outputs an output pulse. An intake pressure sensor 84 provided in the surge tank 32 inputs an output voltage corresponding to an intake pressure PM (a pressure of intake air: an absolute pressure) in the surge tank 32 into the input port 70 through an AD converter 85. A coolant temperature sensor 86, which is provided in the cylinder block 4 of the engine 2, detects a coolant temperature THW of the engine 2 and inputs an output voltage corresponding to the coolant temperature THW to the input port 70 through an AD converter 87. An air-fuel ratio sensor 88, which is provided in the exhaust manifold 48, inputs an output voltage corresponding to an air-fuel ratio to the input port 70 through an AD converter 89. The fuel pressure sensor 50a, which is provided in the fuel distribution pipe 50, inputs an output voltage proportional to a fuel pressure P in the fuel distribution pipe 50 into the input port 70 through an AD converter 90.

The output port 72 is connected to an igniter 102, the fuel injection valves 22, the motor 44 for driving the throttle valve 46, the negative-pressure-type actuator 37 and the electromagnetic spill valve 55 through corresponding drive circuits 92, 94, 96, 98 and 100 respectively. Thus, the components 102, 22, 44, 37 and 55 are drivingly controlled when occasion demands.

Figure 7:
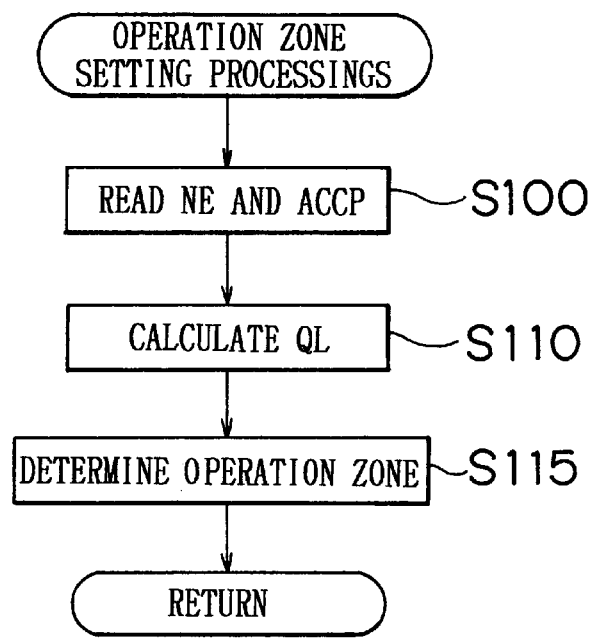
FIG. 7 is a flowchart of operation zone setting processing.

Next, fuel injection control performed after completion of a starting operation of the engine 2 will be described. FIG. 7 shows a flowchart of processing for setting an operation zone required for fuel injection control. This routine is periodically carried out every time the crank shaft rotates by a preset crank angle. Each processing step in laterdescribed flowcharts will be denoted by "S~".

First, an engine speed NE obtained from a signal of the crank angle sensor 82 and a depression amount of the accelerator pedal 74 obtained from a signal of the accelerator opening degree sensor 76 (hereinafter referred to as an accelerator opening degree) ACCP are read into an operation area of the RAM 64 (S100).

Figure 8:
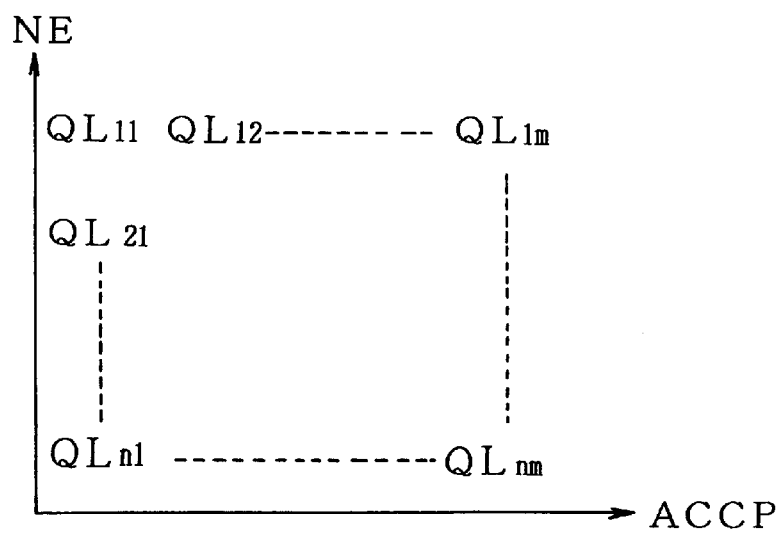
FIG. 8 is an explanatory view of the structure of a map for calculating a lean fuel injection amount.

Next, a lean fuel injection amount QL (an optimal fuel injection amount for setting an output torque of the engine 2 to a required torque during stratified combustion) is calculated based on the engine speed NE and the accelerator opening degree ACCP (S110). The lean fuel injection amount QL is preliminary calculated through experiments and is stored in the ROM 66 as a map using accelerator opening degrees ACCP and engine speeds NE as parameters, as shown in FIG. 8. In S110, a fuel injection amount QL is calculated based on this map. Figures are arranged discretely in the map. Therefore, if there is no coincidental value as a parameter, a calculation is made by means of interpolation. A calculation based on the map through such interpolation is also made in a similar manner in the case where a required figure is to be obtained from a map other than the one shown in FIG. 8.

Figure 9:
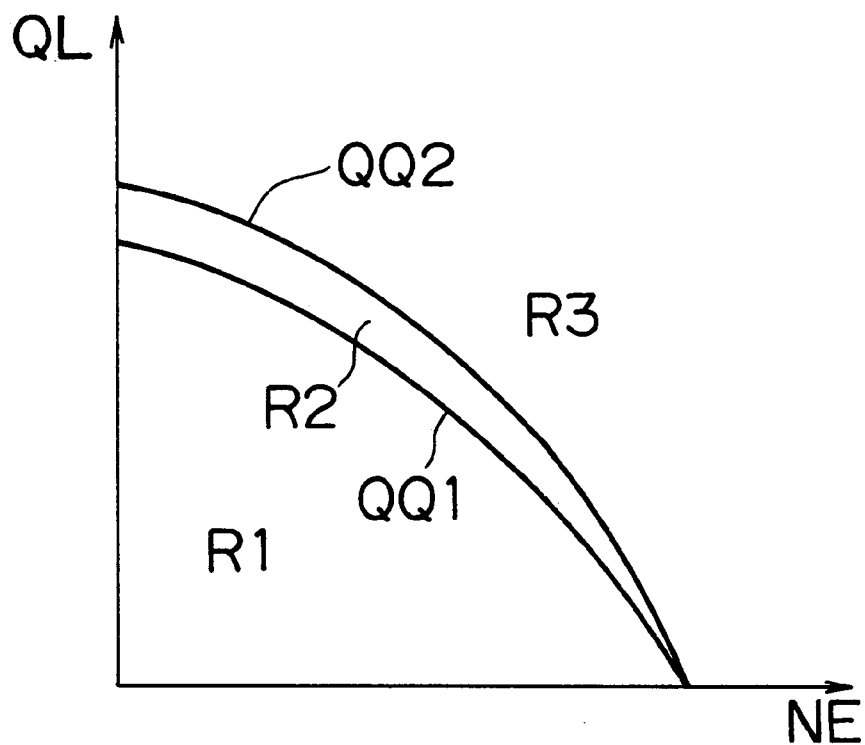
FIG. 9 is an explanatory view of the structure of a map for determining an operation zone.

Next, if one of three operation zones R1, R2 and R3 as shown in FIG. 9 is determined based on the lean fuel injection amount QL and the engine speed NE that have been calculated (S115), the routine is temporarily terminated.

If an operation zone is determined in this manner, a mode of fuel injection is controlled in accordance with the operation zones R1 through R3. In the operation zone R1 wherein the lean fuel injection amount QL is smaller than a threshold value QQ1, fuel of an amount corresponding to the lean fuel injection amount QL is injected at the last stage of a compression stroke. The fuel injected at this moment travels into the recess portion 24 in the piston 6 and collides with a peripheral wall surface 26 of the recess portion 24 (see FIGS. 3 and 4). Fuel that has collided with the peripheral wall surface 26 moves while being gasified and forms a combustible mixture layer in the recess portion 24 in the neighborhood of the ignition plug 20. The ignition plug 20 ignites this stratified combustible mixture, whereby stratified combustion is carried out.

In the operation zone R2, in which the lean fuel injection amount QL is between the threshold value QQ1 and a threshold value QQ2, fuel of an amount corresponding to the lean fuel injection amount QL is injected in a two-stage manner during an intake stroke and at the last stage of a compression stroke. That is, first fuel injection is carried out during an intake stroke, and then, second fuel injection is carried out at the last stage of a compression stroke. Fuel injected at the first stage flows into the combustion chamber 10 together with intake air, and a homogeneous lean mixture is formed in the combustion chamber 10 as a whole. In addition, as described above, a combustible mixture layer is formed in the recess portion 24 in the neighborhood of the ignition plug 20 as a result of the fuel injection carried out at the last stage of a compression stroke. This stratified combustible mixture is ignited by the ignition plug 20. Flames generated by ignition burns the lean mixture occupying the entire combustion chamber 10. That is, in the operation zone R2, weakly stratified combustion with a lower degree of stratification than in the operation zone R1 is carried out.

In the operation zone R3, in which the lean fuel injection amount QL is greater than a threshold value QQ2, fuel of an amount corrected in various manners based on a base fuel injection amount QBS is injected during an intake stroke. This injected fuel flows into the combustion chamber 10 together with intake air, and a homogeneous mixture having the stoichiometric air-fuel ratio (this mixture may be controlled to an airfuel ratio richer than the stoichiometric air-fuel ratio through a fuel-increase correction as will be described later) is formed in the combustion chamber 10 as a whole. As a result, homogeneous combustion is carried out.

Figure 10:
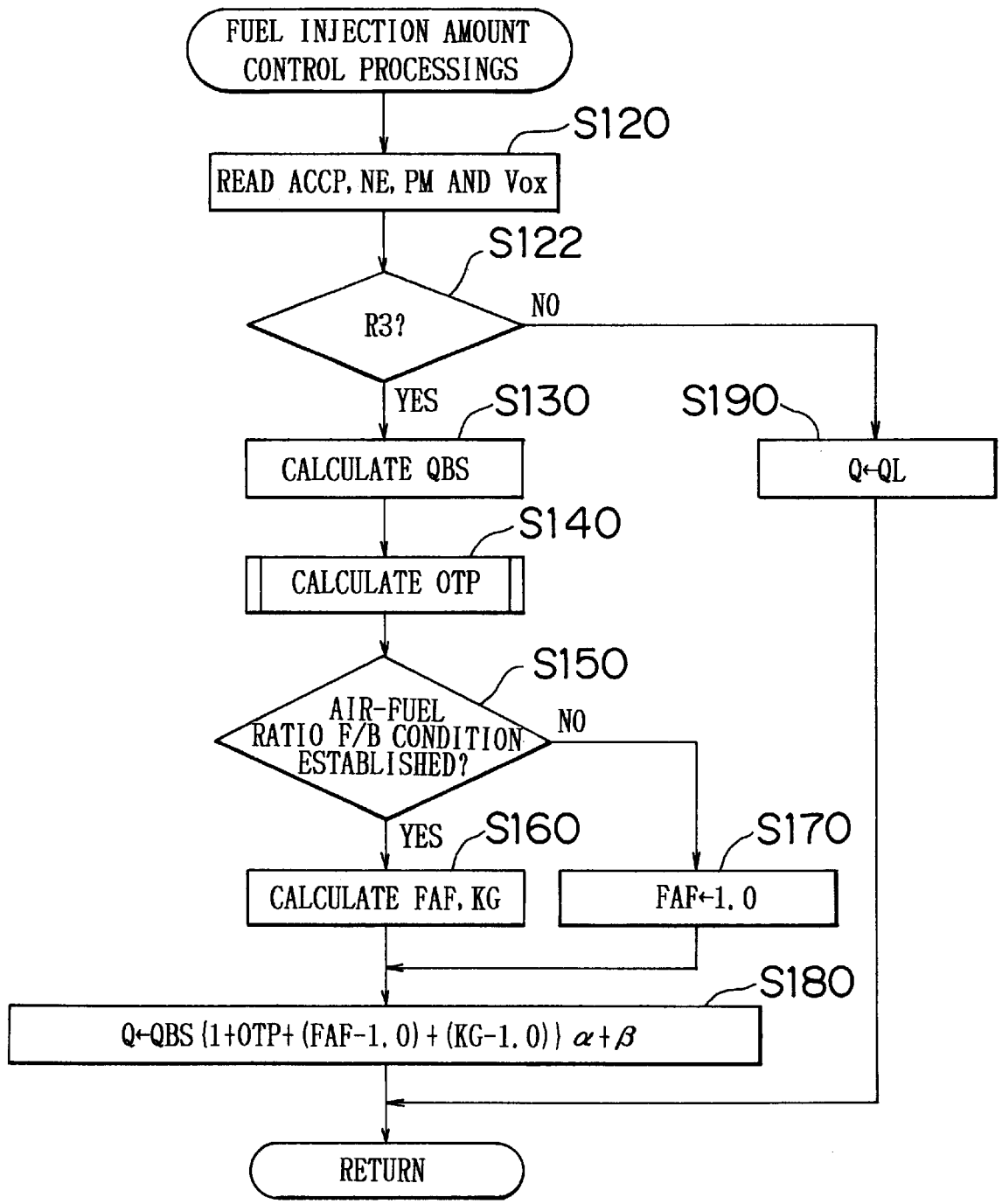
FIG. 10 is a flowchart of fuel injection amount control processing performed in the first embodiment.

FIG. 10 shows a flowchart of fuel injection amount control processing performed based on an operation zone set by the operation zone setting processing. This routine is periodically carried out every time the crank shaft rotates by a preset crank angle.

Upon the starting of the fuel injection amount control processing, first, an accelerator opening degree ACCP that has been obtained from a signal of the accelerator opening degree sensor 76, an engine speed NE that has been obtained from a signal of the crank angle sensor 82, an intake pressure PM that has been obtained from a signal of the intake pressure sensor 84, and an oxygen concentration detection value Vox that has been obtained from the air-fuel ratio sensor 88 are read into an operation area of the RAM 64 (S120).

Figure 11:
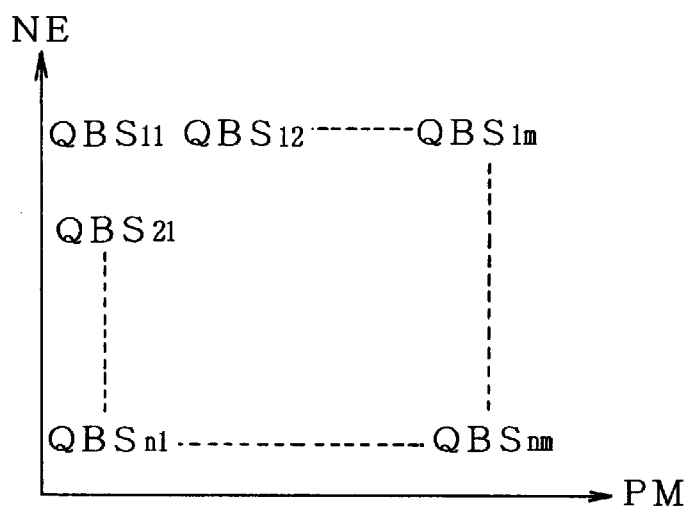
FIG. 11 is an explanatory view of the structure of a map for calculating a base fuel injection amount.

Next, it is determined in the operation zone setting processing (FIG. 7) whether the operation zone R3 is currently set (S122). If it is determined that the operation zone R3 is set ("YES" in S122), a base fuel injection amount QBS is calculated from the intake pressure PM and the engine speed NE, using the map of FIG. 11 which is preliminary set in the ROM 66 (S130).

Figure 12:
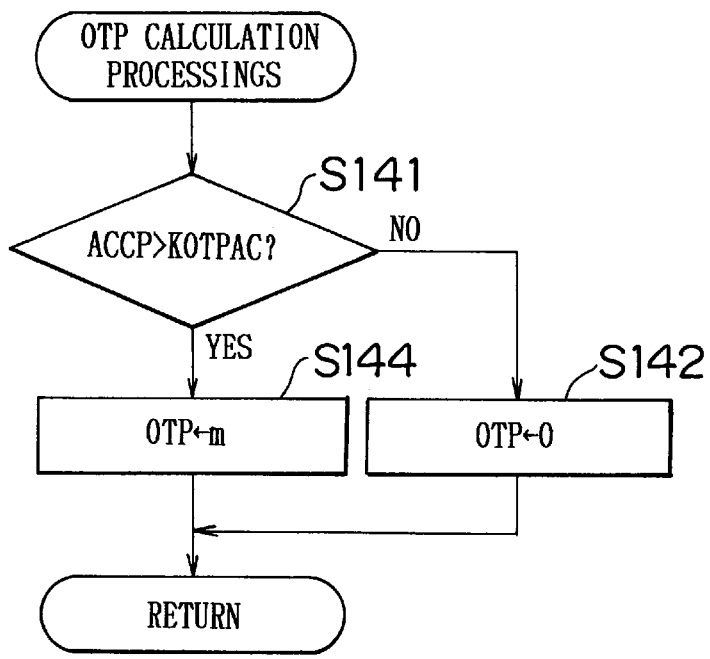
FIG. 12 is a flowchart of high-load increase amount OTP calculation processing performed in the first embodiment.

Next, high-load fuel-increase amount OTP calculation processing is performed (S140). The high-load fuel-increase amount OTP calculation processing will be described based on the flowchart shown in FIG. 12.

First, it is determined whether the accelerator opening degree ACCP has exceeded a high-load fuel-increase criterion value KOTPAC (S141).

If ACCP≦KOTPAC ("NO" in S141), the high-load fuel-increase amount OTP is set to "zero"(S142). That is, fuel-increase correction is not made. Thus, the high-load fuel-increase amount OTP calculation processing is temporarily prohibited.

If ACCP>KOTPAC ("YES" in S141), the high-load fuel-increase amount OTP is set to "m"(e.g., 1>m>0) (S144).

That is, the implementation of fuel-increase correction is set. This fuel-increase correction is made to prevent the catalytic converter 49 from being overheated at the time of a high load.

Referring again to FIG. 10, after calculation of a high-load fuel-increase amount OTP in S140, it is determined whether an air-fuel ratio feedback condition is established (S150). For example, it is determined whether all the following conditions are established. These conditions are: (1) that the engine is not being started, (2) that a fuel-cut operation is not being performed, (3) that the engine has already been warmed up (e.g., coolant temperature THW$\geq$40° C.), (4) that the air-fuel ratio sensor 88 has already been activated, and (5) that the high-load fuel-increase amount OTP is equal to zero.

If the air-fuel ratio feedback condition is established ("YES" in S150), an air-fuel ratio feedback coefficient FAF and a learning value KG are calculated (S160). The air-fuel ratio feedback coefficient FAF is calculated based on an output of the air-fuel ratio sensor 88. The learning value KG is intended to store a discrepancy between the air-fuel ratio feedback coefficient FAF and a central value 1.0. Air-fuel ratio feedback control employing these values can be realized by a variety of known methods (see, e.g., Japanese Patent Application Laid-Open No. 6-10736).

On the other hand, if the air-fuel ratio feedback condition is not established ("NO" in S150), the air-fuel ratio feedback coefficient FAF is set to 1.0 (S170).

After S160 or S170, a fuel injection amount Q is calculated according to the following equation (1) (S180).

$$Q=QBS\{1+OTP+(FAF-1.0)+(KG-1.0)\}\alpha+\beta \quad (1)$$

In the equation (1), $\alpha$ and $\beta$ are coefficients which are suitably set according to a type of the engine 2 and the contents of control.

Then, the fuel injection amount control processing are temporarily terminated.

If an operation zone other than the operation zone R3, namely, the operation zone R1 or R2 is set ("NO" in S122), the fuel injection amount Q is set to the lean fuel injection amount QL that has been calculated in S110 of the operation zone setting processing (FIG. 7) (S190). Then, the fuel injection amount control processing is temporarily terminated.

Next, electromagnetic spill valve control processing for controlling a fuel pressure in the fuel distribution pipe 50 through adjustment of an amount of fuel fed from the high-pressure fuel pump 54 to the fuel distribution pipe 50 will be described with reference to the flowchart in FIG. 13. This routine is periodically carried out every time the crank shaft rotates by a preset crank angle.

Upon the starting of the electromagnetic spill valve control processing, first, a fuel injection amount Q that has been calculated in the aforementioned fuel injection amount control processing, a fuel pressure P in the fuel distribution pipe 50 that has been detected by the fuel pressure sensor 50a, an intake pressure PM that has been detected by the intake pressure sensor 84, and an engine speed NE that has been detected by the crank angle sensor 82 are read into an operation area of the RAM 64 (S210).

Next, it is determined whether the fuel injection amount Q is equal to or greater than a criterion value Q0 (S220). This criterion value Q0 is intended to judge that a (later-described) feed-forward term FF decreases due to an extremely small amount Q of fuel injection and that the control duty DT is likely to become equal to 0% as a result of addition of a feedback term (DTp+DTi). For example, the criterion value Q0 represents a fuel injection amount corresponding to 3% to 4% when converted into the feed-forward term FF expressed as a duty ratio.

If Q$\geq$Q0 ("YES"in S220), a control period Aorg for closingly driving the spill valve for normal operation as shown in FIGS. 14A through 14D is set as a control period for closingly driving the spill valve which is set during a compression stroke (S230).

The control period for closingly driving the spill valve is a crank angle range for closingly driving the electromagnetic spill valve 55. As shown in FIG. 14B, a start timing SSL of the control period for closingly driving the spill valve is set to a timing where the control duty is equal to 100%, and an end timing SEL thereof is set to a timing where the control duty is equal to 0%. In this range, the ECU 60 supplies a coil 55a for closingly driving the electromagnetic spill valve 55 with electric current at a crank angle position corresponding to a control duty (60% in the case of FIG. 14D), whereby the electromagnetic spill valve 55 is closingly driven. The electromagnetic spill valve 55 is maintained in its closingly-driven state until the end timing SEL of the control period for closingly driving the spill valve. The supply of electric current to the coil 55a for closingly driving the electromagnetic spill valve 55 is stopped at the end timing SEL, so that the electromagnetic spill valve 55 stops assuming its closingly- driven state. However, if the control duty is equal to 0%, the coil 55a for closingly driving the electromagnetic spill valve 55 is not supplied with electric current. Therefore, the electromagnetic spill valve 55 does not assume its closingly-driven state.

Even if the ECU 60 stops supplying electric current to the coil 55a for closingly driving the electromagnetic spill valve 55 due to termination of the closingly-driven state thereof, as long as fuel in the high-pressure pump chamber 54f is at a high pressure, the valve body 55b of the electromagnetic spill valve 55 remains pressed against the seat portion 55d against the resistance of a spring 55c which urges the electromagnetic spill valve 55 in its opening direction.

Thus, the electromagnetic spill valve 55 actually remains closed even after termination of its closingly-driven state. As shown in FIG. 14C, a force-feed mode continues until completion of the compression stroke.

A graph indicated by a solid line in FIG. 14B shows a relation between closing timings of the electromagnetic spill valve 55 expressed as crank angles (° CA) and amounts of fuel force-fed from the high-pressure fuel pump 54 to the fuel distribution pipe 50. The control period Aorg for closingly driving the spill valve for normal operation, which is set in S230, is a range extending from the start timing SSL to the end timing SEL along a rectilinear range L shown in FIG. 14B. On the advancement side, the start timing SSL is set by means of extrapolation to the start timing of a compression stroke. On the delayed side, the end timing SEL is set by means of extrapolation to a timing where the amount of fuel that is force-fed is equal to zero. Crank angles indicative of the start timing SSL and the end timing SEL, which represent the control period Aorg for closingly driving the spill valve for normal operation, are preliminary stored in the ROM 66.

Next, a feed-forward coefficient Kf for calculating the feed-forward term FF from the fuel injection amount Q is set to a feed-forward coefficient Korg for normal operation (S240). This feed-forward coefficient Korg for normal operation corresponds to an inverse of the gradient of the straight line L (FIG. 14B) used to set the control period Aorg for closingly driving the spill valve for normal operation.

That is, the feed-forward coefficient Korg corresponds to a coefficient in the case where the amount of fuel that is force-fed is made to correspond to the fuel injection amount Q along the straight line L indicative of a linear equation of a relation between start timings for closingly driving the electromagnetic spill valve 55 and amounts of fuel force-fed to the side of the fuel injection valve 22 and where a start timing for closingly driving the electromagnetic spill valve 55 is thereby calculated.

On the other end, if Q<Q0 ("NO" in S220), a control period Amin for closingly driving the spill valve for small amounts as shown in FIGS. 15A through 15D is set as a control period for closingly driving the spill valve, which is to be set within a compression stroke (S250).

Figure 15A:
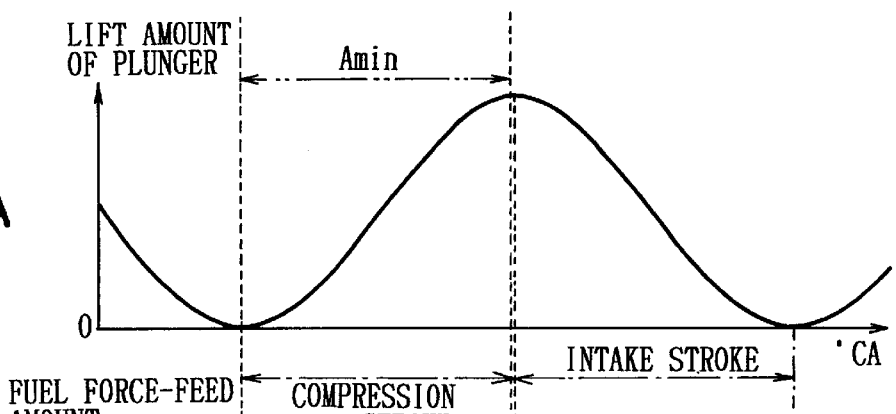
FIGS. 15A through 15D are timing charts for explaining timings of setting control periods for closingly driving a spill valve for small amounts and the driving of an electromagnetic spill valve in the first embodiment.
Figure 15B:
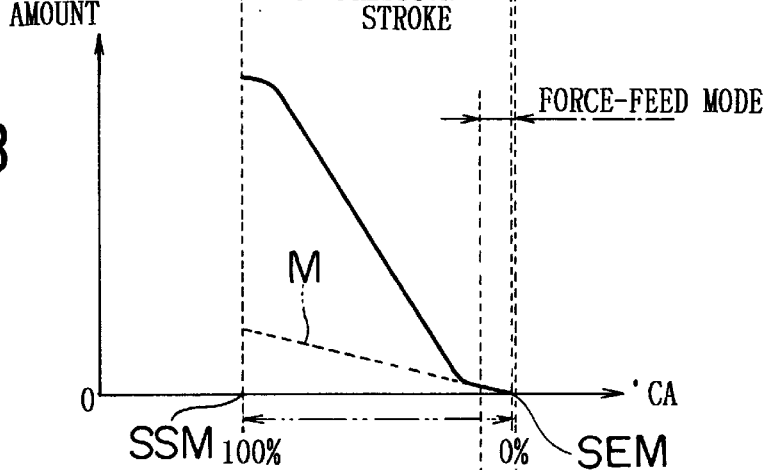
Figure 15C:
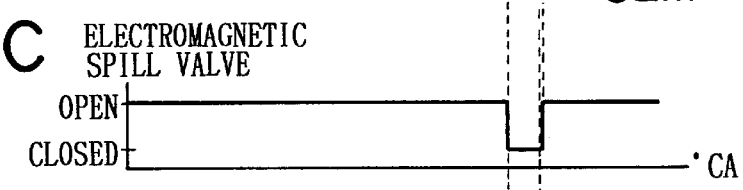
Figure 15D:
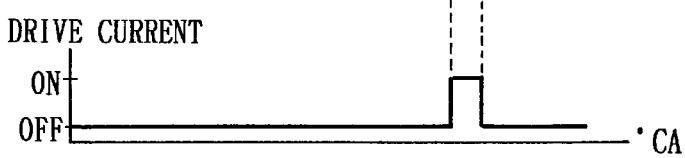

The control period Amin for closingly driving the spill valve for small amounts, which is set in S250, is a range extending from a start timing SSM to an end timing SEM along a straight line M shown in FIG. 15B. The straight line M substantially corresponds to a range where the amount of fuel that is force-fed is small. On the advancement side, the start timing SSM is set by means of extrapolation to the start timing of a compression stroke. On the delayed side, the end timing SEL is set by means of extrapolation to a timing where the amount of fuel that is force-fed is equal to zero. Crank angles indicative of the start timing SSM and the end timing SEM, which represent the control period Amin for closingly driving the spill valve for small amounts, are preliminary stored in the ROM 66.

As can be seen from FIG. 15B, since the gradient of the straight line M is gentler than that of the straight line L, the end timing SEM is delayed with respect to the end timing SEL for normal operation. Thus, the control period Amin for closingly driving the spill valve for small amounts is extended on the delayed side in comparison with the control period Aorg for closingly driving the spill valve for normal operation.

Figure 16:
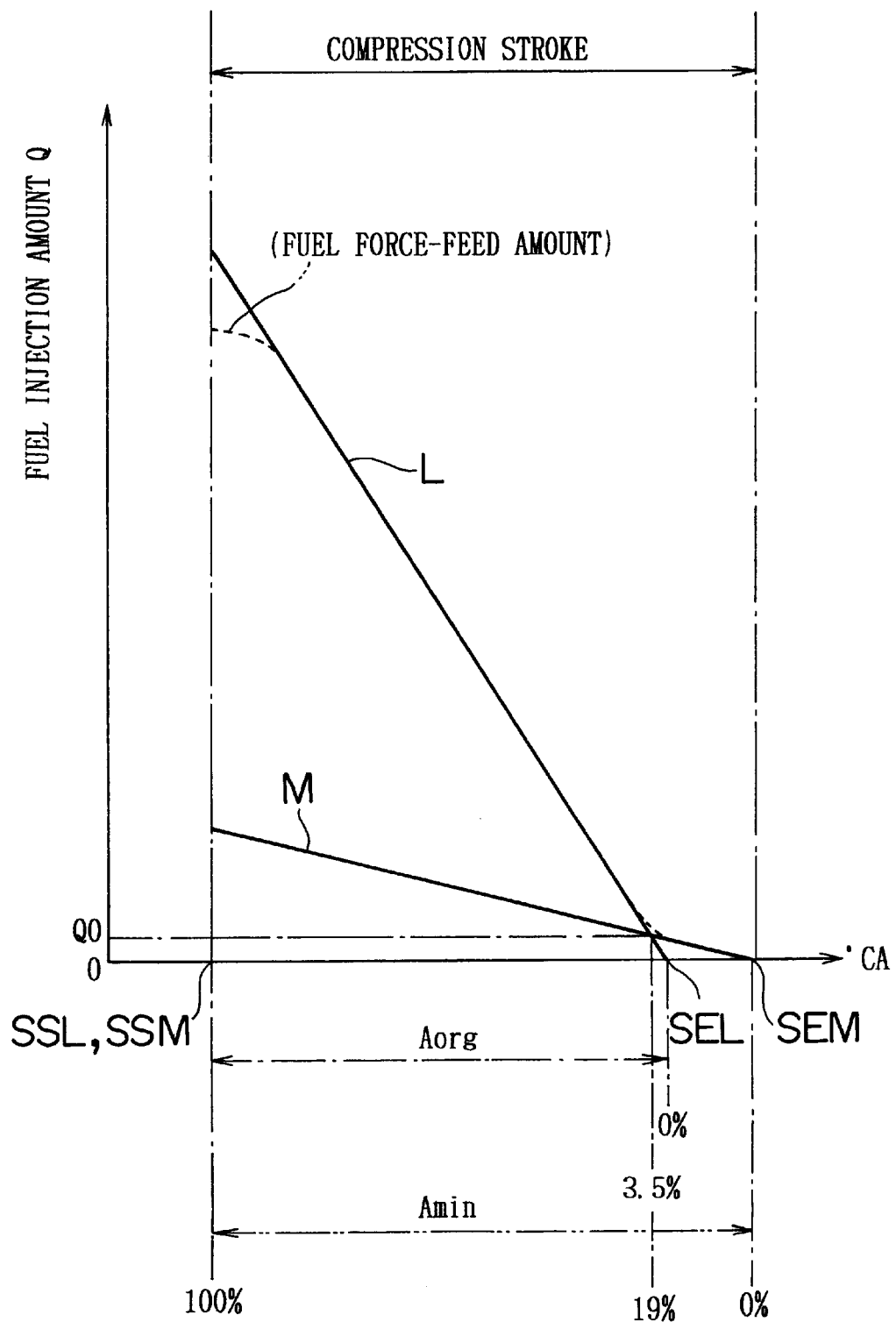
FIG. 16 shows a relation between two lines representative of linear equations for calculating a control duty in the first embodiment.

In the first embodiment, as shown in FIG. 16, the criterion value Q0 is set to an intersection point of the straight lines L, M. That is, the straight lines L, M are switched from one to the other at a single crank angle.

After S250, the feed-forward coefficient Kf for calculating the feed-forward term FF from the fuel injection amount Q is set to a feed-forward coefficient Kmin for small amounts (S260). This feed-forward coefficient Kmin for small amounts corresponds to an inverse of the gradient of the straight line M (FIG. 15B) used to set the control period Amin for closingly driving the spill valve for small amounts. The feed-forward coefficient Kmin is greater than the feed-forward coefficient Korg. That is, the control period Amin for closingly driving the spill valve for small amounts corresponds to a coefficient in the case where the amount of fuel that is force-fed is made to correspond to the fuel injection amount Q along the straight line M indicative of a linear equation of a relation between start timing for closingly driving the electromagnetic spill valve 55 and amounts of fuel force-fed to the side of the fuel injection valve 22 and where a start timing for closingly driving the electromagnetic spill valve 55 is thereby calculated.

After S240 or S260, a feed-forward term FF is calculated from the feed-forward coefficient Kf and the fuel injection amount Q that have been set, as indicated by the following equation (2) (S270).

$$FF = Kf \times Q \quad (2)$$

Next, a target fuel pressure P0 is calculated by means of a map using engine loads (intake pressures PM in this case) and engine speeds NE as parameters (S280). This map, in which engine loads (intake pressures PM in this case) and engine speeds NE are set as parameters by preliminary calculating a suitable fuel pressure through experiments in accordance with an operation state, is stored in the ROM 66.

As indicated by the following equation (3), a pressure difference ΔP between the target fuel pressure P0 and an actual fuel pressure P is calculated (S290).

$$\Delta P = P0 - P \quad (3)$$

As indicated by the following equation (4), a proportional term DTp in the feedback term is calculated from the pressure difference ΔP and a proportional coefficient K1 (S300).

$$DTp = K1 \times \Delta P \quad (4)$$

Furthermore, as indicated by the following equation (5), an integral term DTi in the feedback term is calculated based on the pressure difference ΔP and an integral coefficient K2 (S310).

$$DTi = DTi + K2 \times \Delta P \quad (5)$$

DTi on the right side denotes an integral term DTi that is calculated during the previous control period. The initial value of the integral term DTi is set, for example, to zero.

Then as indicated by the following equation (6), a control duty DT for setting a ratio of the closingly-driven state of the electromagnetic spill valve 55 is calculated based on the feed-forward term FF and the feedback term (DTp+DTi) (S320).

$$DT = Ka \, (DTp + DTi + FF) \quad (6)$$

In the equation (6), Ka is a correction coefficient. In the case where DT assumes a negative value as a result of the calculation of the equation (6), the actual control duty DT is set to zero.

Then, if the control duty DT is set in S320, this control duty DT is set as a control duty for the electromagnetic spill valve 55 during a compression stroke of the high-pressure fuel pump 54 (S330). Then, this routine is temporarily terminated.

In processing for controlling the electromagnetic spill valve constructed as described above, if the fuel injection amount Q changes from Q≧Q0 ("YES" in S220) to Q<Q0 ("NO" in S220), the state where the feed-forward term FF is calculated according to the linear equation indicated by the straight line L is switched to the state where the feed-forward term FF is calculated according to the linear equation indicated by the straight line M, as can be seen from FIG. 16.

At the time of a transition from the control period Aorg for normal operation to the control period Amin for small amounts, the start timing does not change since the timing SSL and the timing SSM coincide with each other in location. On the other hand, the end timing changes to a timing SEM which is located on the delayed side with respect to the timing SEL. This increases the feed-forward term FF that is calculated for the same fuel injection amount Q. According to the example shown in FIG. 16, while the feed-forward term FF is equal to 3.5% for normal operation, it is equal to 19% for small amounts.

Figure 17A:
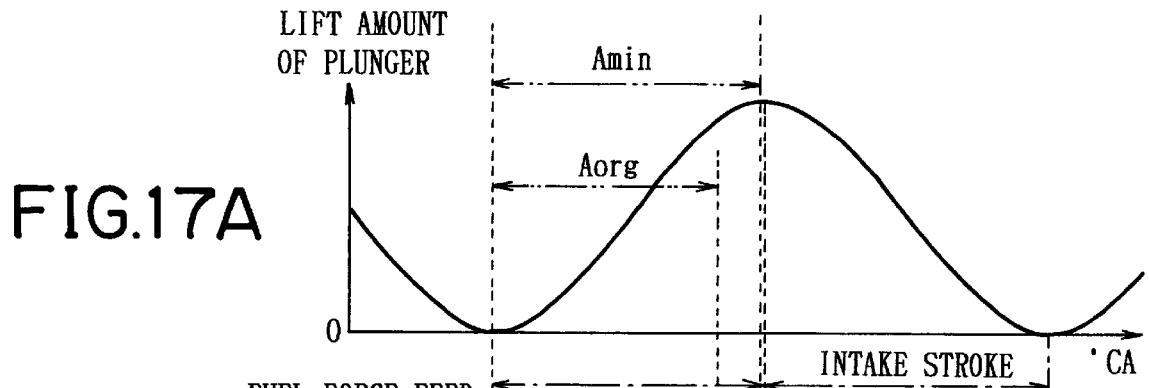
FIGS. 17A through 17E are timing charts for control states at the time of a transition between a control period for closingly driving a spill valve for normal operation and a control period for closingly driving a spill valve for small amounts in the first embodiment.
Figure 17B:
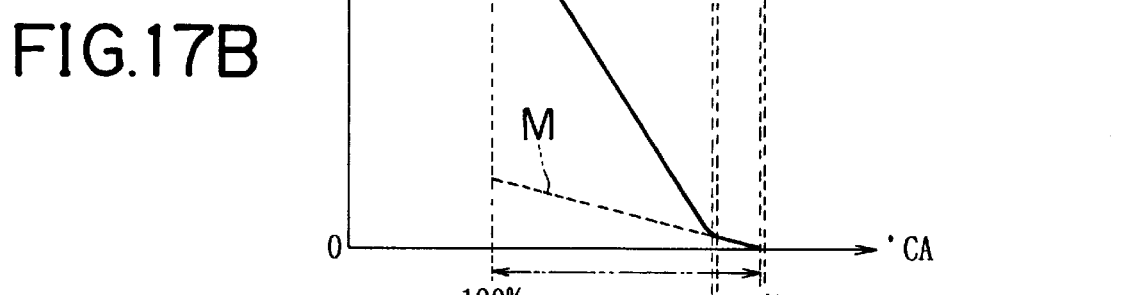
Figure 17C:
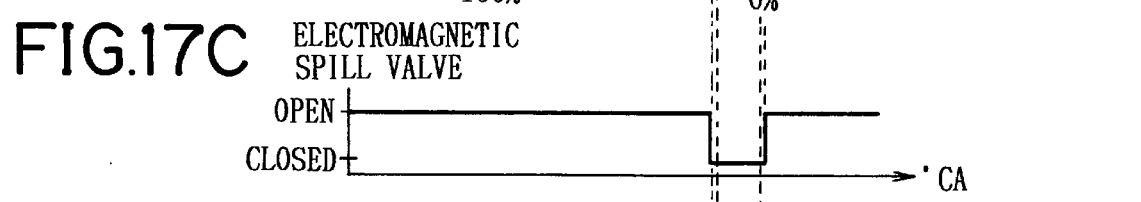
Figure 17D:
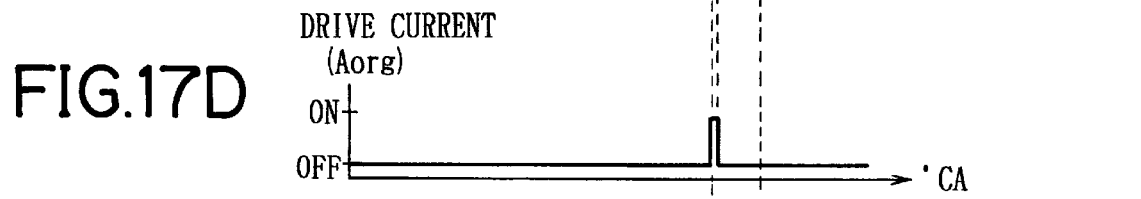
Figure 17E:
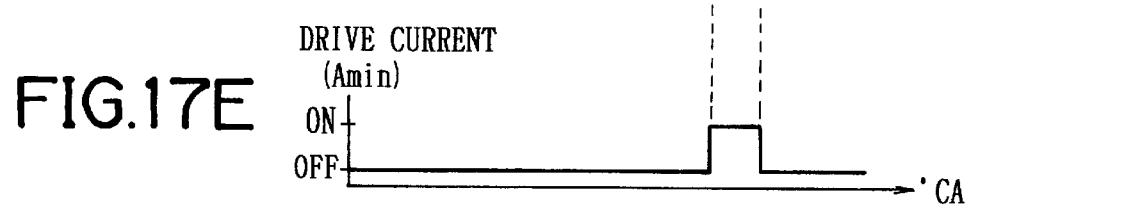

Thus, even if the feed-forward term FF changes and there occurs a difference in control duty as a result, the timing (crank angle) for starting supplying electric current to the coil 55a for closingly driving the electromagnetic spill valve 55 remains unchanged regardless of whether it is for normal operation or for small amounts (see FIGS. 17D and 17E).

Thus, the actual timing where the electromagnetic spill valve 55 starts to be closed does not change (see FIG. 17C).

The timing (crank angle) for stopping supplying electric current to the coil 55a for closingly driving the electromagnetic spill valve differs depending on whether it is for normal operation or for small amounts. This is because the timing for normal operation corresponds to the end timing SEL and the timing for small amounts corresponds to the end timing SEM which is different from the end timing SEL (see FIGS. 17D and 17E). As described above, the actual timing where the electromagnetic spill valve 55 stops being closed coincides with the end of a compression stroke regardless of a timing for stopping the supply of electric current. Thus, the timing where the electromagnetic spill valve 55 stops being closed does not change.

Thus, even if the control period for closingly driving the spill valve is switched between the control period Aorg for normal operation and the control period Amin for small amounts, the switching of the control period does not change the ratio of the force-feed mode during the compression stroke and has no effect on the amount of fuel that is force-fed to the side of the fuel distribution pipe 50.

According to the first embodiment that has been described hitherto, if the fuel injection amount Q becomes smaller than the criterion value Q0 ("NO" in S220), the coefficient Kmin for small amounts is set as a feed-forward coefficient Kf for calculating the feed-forward term FF (S260). In accordance with the relation of the aforementioned straight lines L, M, the coefficient Kmin for small amounts is set to be greater than the coefficient Korg for normal operation, which is set to the feed-forward coefficient Kf (S240) in the case where the fuel injection amount Q is equal to or greater than the criterion value Q0 ("YES" in S220). As described above, this means that the control period Amin for closingly driving the spill valve for small amounts has its end timing SEM that is delayed with respect to the control period Aorg for normal operation.

Hence, the feed-forward term FF calculated in S270 is set to a great value. Thus, even if the feedback term (DTp+DTi), which reflects a difference between the actual fuel pressure P and the target fuel pressure P0, is added, the control duty DT is unlikely to be set to zero.

Therefore, the operation for closing the electromagnetic spill valve 55 never fails to be performed periodically. Operation noise generated by the closing operation does not stop frequently. Accordingly, the situation where operation noise is generated irregularly is avoided, and the possibility of a sense of incongruity given to the driver is reduced.

Besides, as described above, even if the feed-forward term FF is increased by switching the feed-forward coefficient Kf, the crank angle where the electromagnetic spill valve 55 starts being closed remains unchanged. Hence, the amount of fuel that is force-fed to the fuel distribution pipe 50 does not change. Therefore, even if the control period for closingly driving the spill valve is changed, fuel pressure control does not become out of order. In other words, fuel pressure control can be continued stably.

As shown in FIGS. 16 and 17B, the straight line M for setting the control period Amin for closingly driving the spill valve for small amounts is made to coincide with the relation (gradient) between the amount of fuel that is force-fed and the crank angle position at the time when the fuel injection amount is smaller than an amount corresponding to the criterion value Q0. Hence, if the fuel injection amount Q becomes smaller than the criterion value Q0, the feed-forward term FF can be set more desirably in comparison with the case where the relation of the straight line L is directly utilized. That is, the controllability of fuel pressure can further be improved. In addition, the relation expressed by the linear equation (the straight line) makes it possible to continue the processing conveniently and rapidly.

In the first embodiment, the end timing of the control period for closingly driving the spill valve is delayed, whereby the control duty is inhibited from becoming equal to zero. Also, even if the start timing of the control period for closingly driving the spill valve is delayed while maintaining a state where the intersection point of the straight lines L, M coincides with the criterion value Q0, the control duty DT can be increased without changing the amount of fuel that is force-fed to the fuel distribution pipe 50. In other words, the control duty DT can be inhibited from becoming equal to zero. Further, it is also possible to retard both the start timing and the end timing of the control period for closingly driving the spill valve while maintaining a state where the intersection point of the straight lines L, M coincides with the criterion value Q0.

As described above, since the criterion value Q0 is set to the intersection point of the straight lines L, M, these straight lines L, M are switched from one to another at a single crank angle, so that the amount of fuel that is force-fed to the fuel distribution pipe 50 does not change. However, the criterion value Q0 need not be the intersection point of the straight lines L, M unless the crank angle greatly fluctuates. In other words, the criterion value Q0 may deviate from the intersection point. This also holds true in the case where the start timing of the control period for closingly driving the spill valve is delayed or in the case where both the start timing and the end timing of the control period for closingly driving the spill valve are delayed.

Next, a second embodiment of the present invention will be described.

Figure 13:
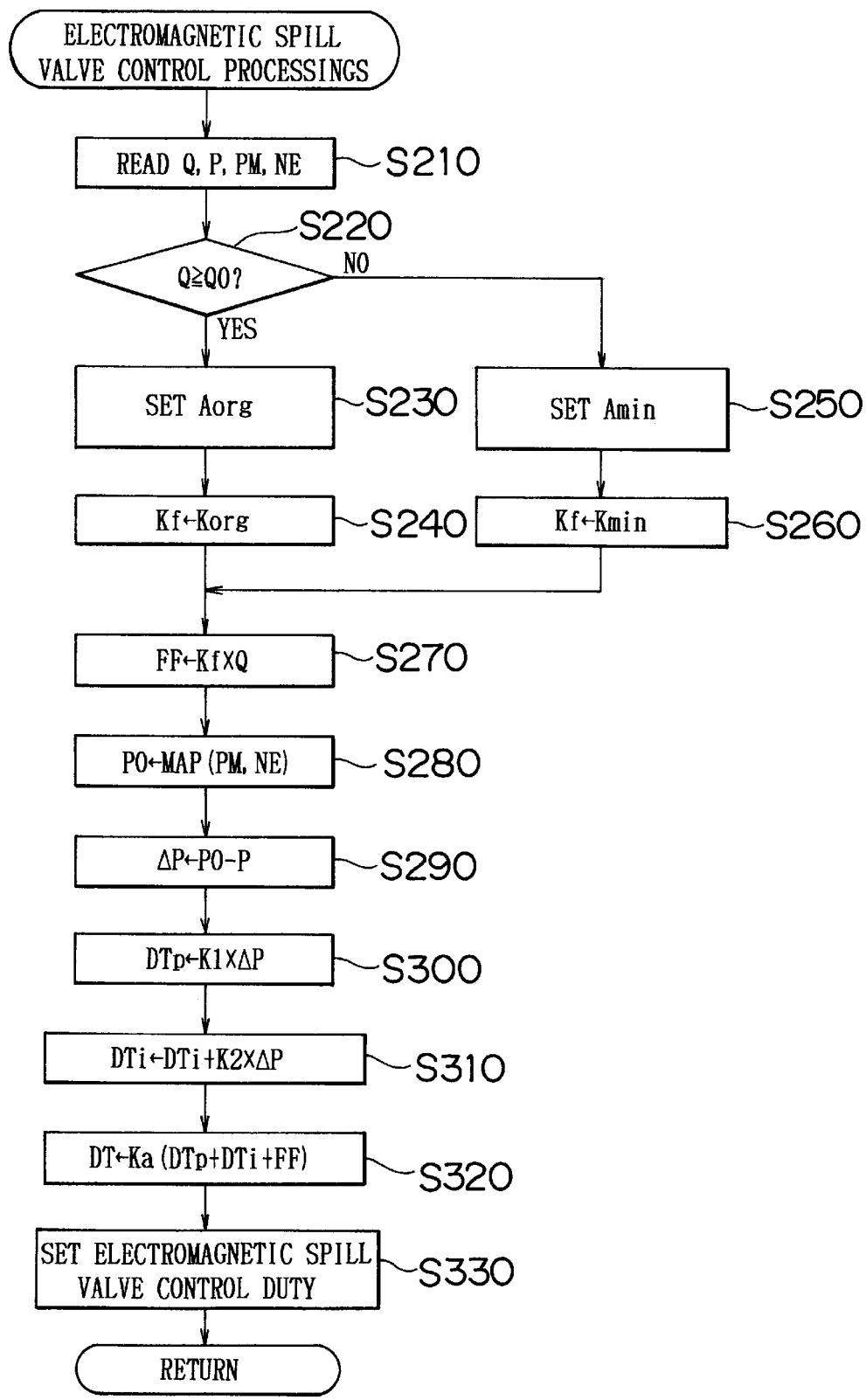
FIG. 13 is a flowchart of electromagnetic spill valve control processing performed in the first embodiment.

The second embodiment is different from the first embodiment in that electromagnetic spill valve control processing shown in FIGS. 18 and 19 is performed instead of the aforementioned electromagnetic spill valve control processing shown in FIG. 13. In the other respects, the construction of the second embodiment is identical to that of the first embodiment.

First, the electromagnetic spill valve control processing shown in FIG. 18 will be described. Upon the starting of this routine, a processing in S410 is performed. This is the same processing as in S210.

Next, proportional term gain setting processing is performed (S420). FIG. 19 shows a flowchart of this processing. In this routine, a proportional coefficient K1 used in S500 (the same processing as in S300) is set.

First, it is determined whether the fuel injection amount Q is equal to or smaller than a criterion value Qidle (S430). The criterion value Qidle is intended to determine whether the fuel injection amount Q is suited for an idle state (sufficiently small).

If Q≦Qidle ("YES" in S430), it is then determined whether the fuel pressure P is stabilized (S440). This is principally intended to determine whether there is an abnormality in the fuel injection valve 22. For example, the fuel pressure P is compared with a long-term average of fuel pressures P obtained during the respective control periods. If the difference therebetween is small, it is determined that the fuel pressure P has been stabilized.

If the fuel pressure P has been stabilized ("YES" in S440), it is then determined whether the vehicle speed V is equal to or lower than a criterion speed V0 (e.g., V0=3 km/h) (S450). This is intended to determine whether the vehicle is in an idle state or in a substantially idle state.

If V≦V0 ("YES" in S450), the proportional coefficient K1 is set to a proportional coefficient K1 min for small amounts (S455). If one of the results in S S430, S440 and S450 is "NO", the proportional coefficient K1 is set to a proportional coefficient K1 org for normal operation (K1 min<K1 org) (S460).

Upon termination of the feedback proportional term gain setting processing, processing S470 through S530 (the same processing as in S270 through S330 in FIG. 13) are performed. Then, this processing is temporarily terminated.

Thus, in the second embodiment, if all the results in S430, S440 and S450 are "YES", the proportional coefficient K1 for calculating the proportional term DTp within the feedback term is made smaller than usual (S455). That is, the feedback control gain for the pressure difference ΔP is made smaller than usual.

In the second embodiment that has been described, if all the results in S430, S440 and S450 are "YES", the feedback control gain decreases as described above (S455). Thus, when the control duty DT approaches zero due to the feedback term, the speed at which the control duty DT approaches zero decreases. Hence, the frequency with which the control duty DT becomes equal to zero decreases. The operation noise generated by the operation for closing the electromagnetic spill valve 55 does not stop frequently. Thus, generation of irregular operation noise is inhibited, and a sense of incongruity given to the driver is reduced.

It is mainly when the presence of an idle state is not judged that one of the results in S430, S440 and S450 is "NO". That is, processing (S455) for slowing response performance of the control duty DT by reducing the control gain are performed exclusively in an idle state where operation noise of the electromagnetic spill valve 55 is easily audible. Thus, the entire fuel injection system is not affected.

Figure 20:
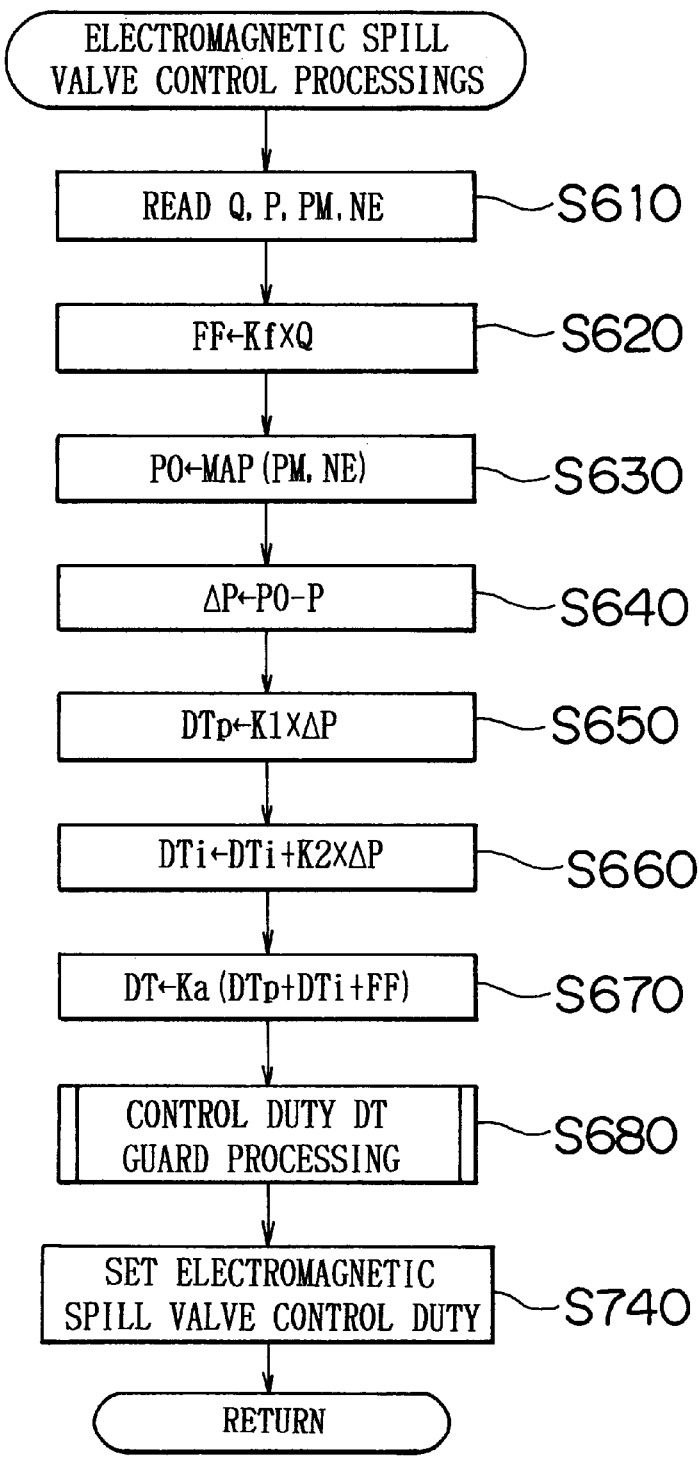
FIG. 20 is a flowchart of electromagnetic spill valve control processing performed in a third embodiment of the invention.
Figure 21:
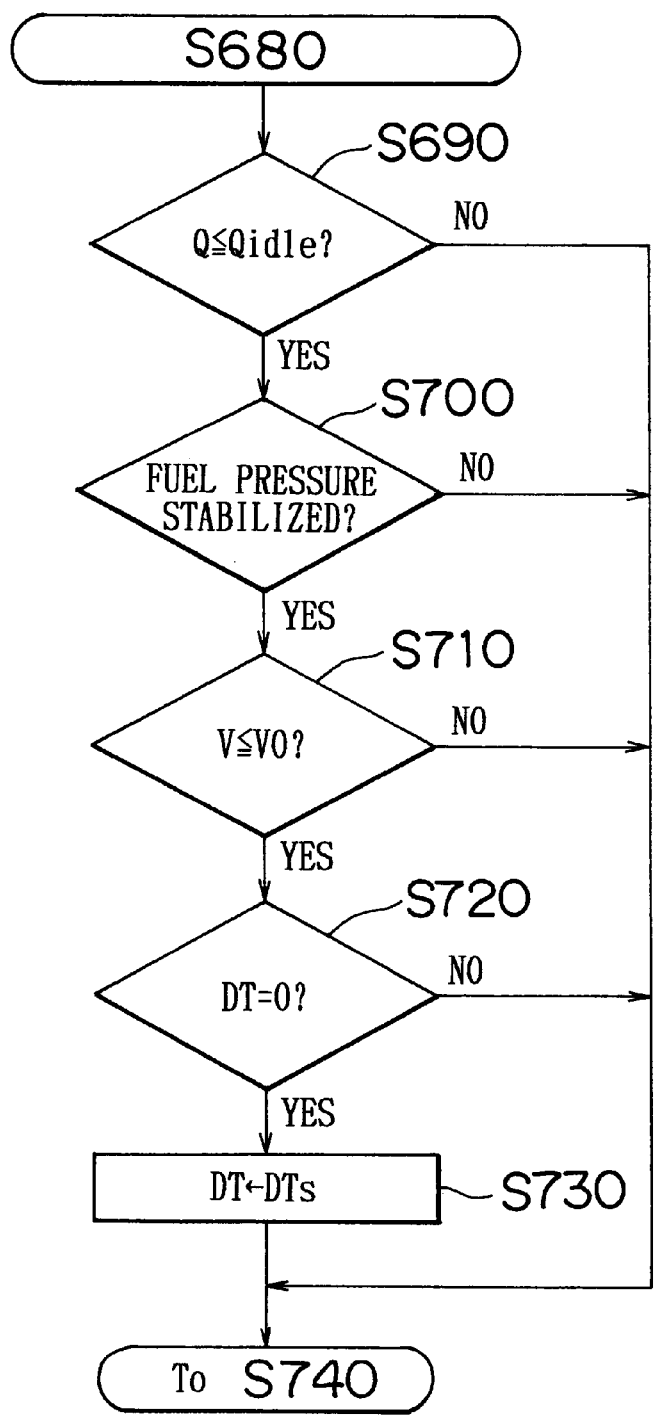
FIG. 21 is a flowchart of control duty guard processing performed in the third embodiment.

Next, a third embodiment of the invention will be described. The third embodiment is different from the first embodiment in that electromagnetic spill valve spill control processing shown in FIGS. 20 and 21 is performed instead of the aforementioned electromagnetic spill valve control processing shown in FIG. 13. In the other respects, the construction of the third embodiment is identical to that of the first embodiment.

The electromagnetic spill valve control processing shown in FIG. 20 will be described. Upon the starting of this routine, first, processing in S610 through S670 is performed. This processing is identical to that in S210 and S270 through S320 in FIG. 13.

In a DT guard processing (S680) performed after S670, processing shown in FIG. 21 is performed. First, in S690, S700 and S710, the same judgment processing as those in S430, S440 and S450 as described in the second embodiment are performed. If all the results in S690, S700 and S710 are "YES", it is determined whether the control duty DT calculated in the last S670 is equal to zero (S720).

If DT=0 ("YES" in S720), the control duty DT is set to a guard value DTs (S730). This guard value DTs is intended to prevent the control duty DT from becoming equal to zero and is set to a value that does not affect the controllability (e.g., a small value approximately equal to 2% to 3%).

If one of the results in S690 through S720 is "NO", the control duty is maintained at the value set in S670 instead of being set to the guard value DTs.

Upon completion of the control duty DT guard processing (S680), the control duty DT is set as a control duty for the electromagnetic spill valve 55 during a compression stroke of the high-pressure fuel pump 54 (S740). Then, this routine is temporarily terminated.

Thus, according to the third embodiment, in the case where all the results in S690 through S710 are "YES", if it is further determined that the control duty DT is equal to zero ("YES" in S720), the control duty DT is set to the guard value DTs so that the control duty DT is prevented from becoming equal to zero.

According to the third embodiment that has been described hitherto, if all the results in S690 through S720 are "YES", the control duty DT is set to the guard value DTs so that the control duty DT is inhibited from becoming equal to zero (S730). Thus, even if the control duty DT becomes equal to zero due to the feedback term as a result of calculation, the control duty is actually maintained at a value greater than zero. Therefore, the electromagnetic spill valve 55 is stopped from being closingly driven, and operation noise does not cease. Thus, generation of irregular operation noise is inhibited, and a sense of incongruity given to the driver is reduced.

If one of the results in S690, S700 and S710 is "NO", a fuel-cut processing may be performed through other control operations. The third embodiment eliminates the possibility of such a case. Therefore, the fuel-cut operation is not hampered under a circumstance requiring the fuel-cut operation, and the entire fuel injection system is not affected.

In judging the fuel injection amount Q in S220 of the first embodiment, S430 of the second embodiment or S690 of the third embodiment, a hysteresis may be provided to further inhibit the occurrence of hunting during control.

The control duty DT may be more strictly inhibited from becoming equal to zero by combining the constructions of the aforementioned embodiments.

In the illustrated embodiment, the controller (ECU 60) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 7, 10, 12, 13 and 18–21 can be used as the controller. A distributed processing architecture can be used for maximum data/signal processing capability and speed.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations that are exemplary, other combinations and configurations, including more, less or only a single element, are also within the spirit and scope of the invention.

What is claimed is:

1. A control apparatus for a high-pressure fuel pump employed in an internal combustion engine which periodically repeats an intake stroke in which fuel is sucked from a low-pressure side into a pump chamber by increasing a volume in the pump chamber, and a compression stroke in which the fuel in the pump chamber is compressed by reducing a volume in the pump chamber, the control apparatus comprising:

a spill valve which switches its operation between (a) a non-force-feed mode in which no fuel is force-fed from the pump chamber to a fuel injection valve during the compression stroke, and (b) a force-feed mode in which fuel is force-fed to the fuel injection valve;

a fuel pressure detector which detects a fuel pressure for the fuel injection valve; and a controller that:
  determines a fuel injection amount corresponding to an operation state of the internal combustion engine;
  determines a feed-forward term, which is used for a duty control, based on the determined fuel injection amount;
  determines a feedback term, for the duty control, based on the detected fuel pressure;
  determines a duty ratio, for the duty control, for open and closed states of the spill valve based on a sum of the feed-forward term and the feedback term;
  determines starting and ending timings for controlling closing of the spill valve based on the duty ratio; and
  delays at least one of the starting and ending timings for controlling closing of the spill valve when the determined fuel injection amount is smaller than a predetermined amount.

2. The control apparatus according to claim 1, wherein the controller further sets a relation between (a) an amount of fuel force-fed to the fuel injection valve and (b) the starting timing for controlling closing of the spill valve as a first linear equation while the determined fuel injection amount is equal to or greater than the predetermined amount, and sets the relation as a second linear equation, different from the first linear equation, when the determined fuel injection amount is smaller than the predetermined amount.

3. The control apparatus according to claim 2, wherein an amount of fuel force-fed to the fuel injection valve obtained from the first linear equation and obtained from the second linear equation is the same at the time that the determined fuel injection amount becomes equal to the predetermined amount.

4. The control apparatus according to claim 2, wherein a slope of the second linear equation is smaller than a slope of the first linear equation.

5. A control apparatus for a high-pressure fuel pump employed in an internal combustion engine which periodically repeats an intake stroke in which fuel is sucked from a low-pressure side into a pump chamber by increasing a volume in the pump chamber, and a compression stroke in which the fuel in the pump chamber is compressed by reducing a volume in the pump chamber, the control apparatus comprising:

a spill valve which switches its operation between (a) a non-force-feed mode in which no fuel is force-fed from the pump chamber to a fuel injection valve during the compression stroke, and (b) a force-feed mode in which fuel is force-fed to the fuel injection valve;

a fuel pressure detector which detects a fuel pressure for the fuel injection valve; and a controller that:
  determines a fuel injection amount corresponding to an operation state of the internal combustion engine;
  determines a feed-forward term, which is used for a duty control, based on the determined fuel injection amount;
  determines a feedback term, for the duty control, based on the detected fuel pressure;
  determines a duty ratio, for the duty control, for open and closed states of the spill valve based on a sum of the feed-forward term and the feedback term;
  determines starting and ending timings for controlling closing of the spill valve based on the duty ratio; and
  reduces a control gain of the feedback term when the determined fuel injection amount is smaller than a predetermined amount.

6. A control apparatus for a high-pressure fuel pump employed in an internal combustion engine which periodically repeats an intake stroke in which fuel is sucked from a low-pressure side into a pump chamber by increasing a volume in the pump chamber, and a compression stroke in which the fuel in the pump chamber is compressed by reducing a volume in the pump chamber, the control apparatus comprising:

a spill valve which switches its operation between (a) a non-force-feed mode in which no fuel is force-fed from the pump chamber to a fuel injection valve during the compression stroke, and (b) a force-feed mode in which fuel is force-fed to the fuel injection valve;

a fuel pressure detector which detects a fuel pressure for the fuel injection valve; and a controller that:
  determines a fuel injection amount corresponding to an operation state of the internal combustion engine;
  determines a feed-forward term, which is used for a duty control, based on the determined fuel injection amount;
  determines a feedback term, for the duty control, based on the detected fuel pressure;
  determines a duty ratio, for the duty control, for open and closed states of the spill valve based on a sum of the feed-forward term and the feedback term;
  determines starting and ending timings for controlling closing of the spill valve based on the duty ratio; and
  changes the duty ratio to a value greater than zero when the determined fuel injection amount is smaller than a predetermined amount and when the duty ratio is smaller than a predetermined value.

7. A control method for a high-pressure fuel pump employed in an internal combustion engine which periodically repeats an intake stroke in which fuel is sucked from a low-pressure side into a pump chamber by increasing a volume in the pump chamber, and a compression stroke in which the fuel in the pump chamber is compressed by reducing a volume in the pump chamber, the method comprising:

switching an operation mode of a spill valve between (a) a non-force-feed mode in which no fuel is force-fed from the pump chamber to a fuel injection valve during the compression stroke, and (b) a force-feed mode in which fuel is force-fed to the fuel injection valve;

detecting a fuel pressure for the fuel injection valve;

determining a fuel injection amount corresponding to an operation state of the internal combustion engine;

determining a feed-forward term, which is used for a duty control, based on the determined fuel injection amount;

determining a feedback term, for the duty control, based on the detected fuel pressure;

determining a duty ratio, for the duty control, for open and closed states of the spill valve based on a sum of the feed-forward term and the feedback term;

determining starting and ending timings for controlling closing of the spill valve based on the duty ratio; and delaying at least one of the starting and ending timings for controlling closing of the spill valve when the determined fuel injection amount is smaller than a predetermined amount.

8. The control method according to claim 7, further comprising:

setting a relation between (a) an amount of fuel force-fed to the fuel injection valve and (b) the starting timing for controlling closing the spill valve as a first linear equation while the determined fuel injection amount is equal to or greater than the predetermined amount; and setting the relation as a second linear equation, different from the first linear equation, when the determined fuel injection amount is smaller than the predetermined amount.

9. The control method according to claim 8, wherein an amount of fuel force-fed to the fuel injection valve obtained from the first linear equation and obtained from the second linear equation is the same at the time that the determined fuel injection amount becomes equal to the predetermined amount.

10. The control method according to claim 8, wherein a slope of the second linear equation is smaller than a slope of the first linear equation.

11. A control method for a high-pressure fuel pump employed in an internal combustion engine which periodically repeats an intake stroke in which fuel is sucked from a low-pressure side into a pump chamber by increasing a volume in the pump chamber, and a compression stroke in which the fuel in the pump chamber is compressed by reducing a volume in the pump chamber, the method comprising:

switching an operation mode of a spill valve between (a) a non-force-feed mode in Which no fuel is force-fed from the pump chamber to a fuel injection valve during the compression stroke, and (b) a force-feed mode in which fuel is force-fed to the fuel injection valve;

detecting a fuel pressure for the fuel injection valve;

determining a fuel injection amount corresponding to an operation state of the internal combustion engine;

determining a feed-forward term, which is used for a duty control, based on the determined fuel injection amount;

determining a feedback term, for the duty control, based on the detected fuel pressure;

determining a duty ratio, for the duty control, for open and closed states of the spill valve based on a sum of the feed-forward term and the feedback term;

determining starting and ending timings for controlling closing of the spill valve based on the duty ratio; and reducing a control gain of the feedback term when the determined fuel injection amount is smaller than a predetermined amount.

12. A control method for a high-pressure fuel pump employed in an internal combustion engine which periodically repeats an intake stroke in which fuel is sucked from a low-pressure side into a pump chamber by increasing a volume in the pump chamber, and a compression stroke in which the fuel in the pump chamber is compressed by reducing a volume in the pump chamber, the method comprising:

switching an operation mode of a spill valve between (a) a non-force-feed mode in which no fuel is force-fed from the pump chamber to a fuel injection valve during the compression stroke, and (b) a force-feed mode in which fuel is force-fed to the fuel injection valve;

detecting a fuel pressure for the fuel injection valve;

determining a fuel injection amount corresponding to an operation state of the internal combustion engine;

determining a feed-forward term, which is used for a duty control, based on the determined fuel injection amount;

determining a feedback term, for the duty control, based on the detected fuel pressure;

determining a duty ratio, for the duty control, for open and closed states of the spill valve based on a sum of the feed-forward term and the feedback term;

determining starting and ending timings for controlling closing of the spill valve based on the duty ratio; and changing the duty ratio to a value greater than zero when the determined fuel injection amount is smaller than a predetermined amount and when the duty ratio is smaller than a predetermined value.

* * * * *